United States Patent
Jang et al.

(10) Patent No.: US 10,575,360 B2
(45) Date of Patent: Feb. 25, 2020

(54) APPARATUS AND METHOD FOR PROVIDING MULTI-CONNECTION USING DIFFERENT WIRELESS CONNECTION TECHNOLOGIES IN WIRELESS COMMUNICATION SYSTEM

(71) Applicant: Samsung Electronics Co., Ltd., Suwon-si, Gyeonggi-do (KR)

(72) Inventors: Jaehyuk Jang, Suwon-si (KR); Soenghun Kim, Suwon-si (KR); Sangbum Kim, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 137 days.

(21) Appl. No.: 15/563,809

(22) PCT Filed: Apr. 4, 2016

(86) PCT No.: PCT/KR2016/003442
§ 371 (c)(1),
(2) Date: Oct. 2, 2017

(87) PCT Pub. No.: WO2016/159731
PCT Pub. Date: Oct. 6, 2016

(65) Prior Publication Data
US 2018/0098376 A1 Apr. 5, 2018

Related U.S. Application Data

(60) Provisional application No. 62/142,739, filed on Apr. 3, 2015.

(51) Int. Cl.
*H04W 16/14* (2009.01)
*H04W 72/04* (2009.01)
(Continued)

(52) U.S. Cl.
CPC .......... *H04W 76/27* (2018.02); *H04W 16/14* (2013.01); *H04W 72/0406* (2013.01);
(Continued)

(58) Field of Classification Search
CPC ..... H04W 28/02; H04W 72/12; H04W 88/06; H04W 76/27; H04W 76/10;
(Continued)

(56) References Cited

U.S. PATENT DOCUMENTS 8,442,467 B1* 5/2013 Rausch ............... H04B 1/0064
343/700 MS
2009/0168724 A1* 7/2009 Umesh ................ H04W 36/02
370/331

(Continued)

FOREIGN PATENT DOCUMENTS

EP    2835925 A1    2/2015
KR    10-2014-0118650 A    10/2014

OTHER PUBLICATIONS

Harry Newton, "Newton's Telecom Dictionary 27th Edition," 2013, Flatiron Publishing, p. 193.*

(Continued)

*Primary Examiner* — Mark H Rinehart
*Assistant Examiner* — Kenneth P Hunt
(74) *Attorney, Agent, or Firm* — Jefferson IP Law, LLP

(57) ABSTRACT

The present disclosure relates to a communication technique of fusing a 5G communication system for supporting higher data transmission rate beyond a 4G system with an IoT technology and a system thereof. The present disclosure may be applied to intelligent services (e.g., smart home, smart building, smart city, smart car or connected car, health care, digital education, retail business, security and safety related service, or the like) based on the 5G communication technology and the IoT related technology. More specifically, a
(Continued)

method of the present disclosure for providing multi-connection of a terminal using different radio access technologies in a wireless communication system comprises the steps of: transmitting/receiving data through a first bearer corresponding to a first communication; transmitting/receiving data through a second bearer corresponding to a second communication; receiving, from a base station, a radio resource control (RRC) message which directs reestablishment of the first bearer as the second bearer or reestablishment of the second bearer as the first bearer; and reestablishing the first bearer or the second bearer on the basis of the RRC message.

9 Claims, 28 Drawing Sheets

(51) Int. Cl.
  *H04W 72/12* (2009.01)
  *H04W 88/06* (2009.01)
  *H04W 76/27* (2018.01)
  *H04W 76/10* (2018.01)
  *H04W 76/20* (2018.01)

(52) U.S. Cl.
  CPC ....... *H04W 72/1215* (2013.01); *H04W 76/10* (2018.02); *H04W 76/20* (2018.02); *H04W 88/06* (2013.01); *H04W 72/0453* (2013.01)

(58) Field of Classification Search
  CPC ......... H04W 72/0406; H04W 72/1215; H04W 76/20; H04W 16/14; H04W 72/0453; H04W 76/19; H04W 76/18
  See application file for complete search history.

(56) References Cited

U.S. PATENT DOCUMENTS

| | | |
|---|---|---|
| 2013/0028069 A1 | 1/2013 | Pelletier et al. |
| 2014/0241317 A1 | 8/2014 | Jamadagni et al. |
| 2014/0313877 A1* | 10/2014 | Gao ................ H04W 24/04 370/216 |
| 2014/0362829 A1 | 12/2014 | Kazmi et al. |
| 2015/0043486 A1 | 2/2015 | Ozturk et al. |
| 2015/0045052 A1 | 2/2015 | Pao et al. |
| 2015/0049707 A1* | 2/2015 | Vajapeyam ........... H04W 24/10 370/329 |
| 2015/0208286 A1* | 7/2015 | Ozturk .............. H04W 36/0022 370/331 |
| 2016/0050605 A1 | 2/2016 | Kim et al. |
| 2016/0212661 A1 | 7/2016 | Basu Mallick et al. |
| 2016/0278138 A1* | 9/2016 | Chen ................. H04W 36/0027 |

OTHER PUBLICATIONS

"LTE Quick Reference: RRC Connection ReEstablishnnent" ShareTechnote Aug. 9, 2014 http://www.sharetechnote.com/html/Handbook_LTE_RRC_ConnectionReestablishment.html.*

Kumar Swamy Pasupuleti "RRC Connection Reestablishment Request" How LTE Stuff Works? Oct. 17. 2011 http://howltestuffworks.blogspot.com/2011/10/rrc-connection-reestablishment-request.html.*

Kumar Swamy Pasupuleti "RRC Connection Reconfiguration" How LTE Stuff Works? Oct. 15, 2011 http://howltestuffworks.blogspot.com/2011/10/rrc-connection-reconfiguration.html.*

Daniel E. Capano, "Wi-Fi and the OSI model" Sep. 18, 2014 https://www.controleng.com/articles/wi-fi-and-the-osi-model/.*

* cited by examiner

APPARATUS AND METHOD FOR PROVIDING MULTI-CONNECTION USING DIFFERENT WIRELESS CONNECTION TECHNOLOGIES IN WIRELESS COMMUNICATION SYSTEM

TECHNICAL FIELD

Various embodiments of the present invention relate to a wireless communication system, and more particularly, to provision of a multi-connection in a wireless communication system.

BACKGROUND ART

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in a very high frequency (mmWave) band (e.g., like 60 GHz band). To relieve a path loss of a radio wave and increase a transfer distance of the radio wave in the very high frequency band, in the 5G communication system, beamforming, massive MIMO, full dimensional MIMO (FD-MIMO), array antenna, analog beam-forming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, the Internet is evolved from a human-centered connection network through which a human being generates and consumes information to the Internet of Things (IoT) network that transmits/receives information between distributed components such as things and processes the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things has been researched. In the IoT environment, an intelligent Internet technology (IT) service that creates a new value in human life by collecting and analyzing data generated in the connected things may be provided. The IoT may be applied to fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, the 5G communication technologies, such as the sensor network, the machine to machine (M2M), and the machine type communication (MTC), have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

As described above, discussions are underway to develop communication methods in various fields to meet wireless data traffic demands. For example, what is being discussed may include terminal-to-terminal communication, a frequency integration system for operating a plurality of cells, and a multi-antenna system using a large-scale antenna.

DISCLOSURE

Technical Problem

An object of the present disclosure is directed to provision of an apparatus and method for providing multi-connections using different radio access technologies in a wireless communication system.

Another object of the present disclosure is directed to provision of a method and apparatus for performing a scheduling request (SR) in a plurality of cells having a physical uplink control channel (PUCCH) in a mobile communication system.

Still another object of the present disclosure is directed to provision of a method and apparatus for setting a wireless LAN channel measurement of a terminal in a wireless communication system.

Technical Solution

Various embodiments of the present invention are directed to the provision of a method for providing a multi-connection of a terminal using different radio access technologies in a wireless communication system, including: transmitting/receiving data through a first bearer corresponding to first communication; transmitting/receiving data through a second bearer corresponding to second communication; receiving a radio resource control message instructing to reestablish the first bearer as the second bearer or reestablish the second bearer as the first bearer from a base station; and reestablishing the first bearer or the second bearer based on the RRC control message.

Various embodiments of the present invention are directed to the provision of a terminal for providing a multi-connection of a terminal using different radio access technologies in a wireless communication system, including: a communication unit configured to transmit/receive a signal to and from a base station; and a controller configured to perform a control to transmit/receive data through a first bearer corresponding to first communication, transmit/receive data through a second bearer corresponding to second communication, receive a radio resource control (RRC) control message instructing to reestablish the first bearer as the second bearer or reestablish the second bearer as the first bearer from the base station, and reestablish the first bearer or the second bearer based on the RRC control message.

Advantageous Effects

The method and apparatus according to the embodiment of the present disclosure can provide the large capacity and the high-speed communication service by performing multi-connections using different radio access technologies in the wireless communication system.

Also, according to an embodiment of the present disclosure, the physical uplink control channel (PUCCH) is also provided even in the specific secondary cell (SCell) other than the primary cell (Pcell), so that the PUCCH load can be dispersed.

BEST MODE

Figure 1:
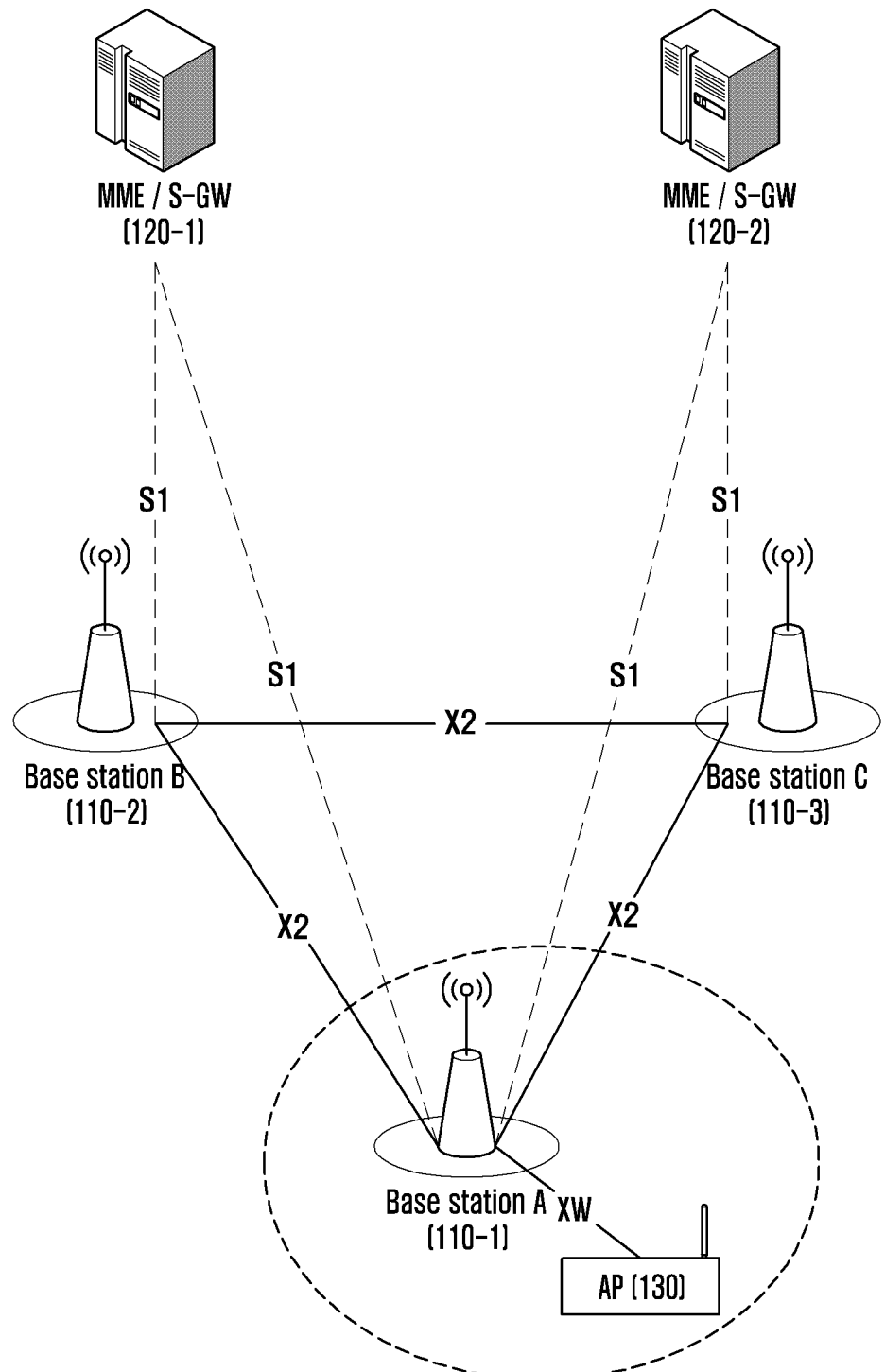
FIG. 1 is a diagram illustrating an example of a network structure of a wireless communication system according to an embodiment of the present disclosure.

Hereinafter, exemplary embodiments of the present disclosure will be described in detail with reference to the accompanying drawings. At this time, it is to be noted that like reference numerals denote like elements in the accompanying drawings. Further, detailed descriptions related to well-known functions or configurations will be ruled out in order not to unnecessarily obscure the subject matter of the present disclosure.

Further, in describing in detail embodiments of the present disclosure, an advanced E-UTRA (or referred to as LTE-A) system supporting a carrier aggregation will be mainly described. However, a main subject of the present disclosure may be slightly changed to be applied to other communication systems having similar technical backgrounds and channel forms without greatly departing the scope of the present disclosure, which may be determined by those skilled in the art to which the present disclosure pertains. For example, a main subject of the present disclosure may also be applied even to a multicarrier HSPA supporting the carrier aggregation.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

<First Embodiment>

A wireless communication system makes great advances in hardware or software to provide better communication quality. For example, communication technologies using a plurality of antennas, not one antenna have been developed and technologies for more efficiently recovering a physical signal to data have also been developed.

As one of many technologies to meet a demand for gradually increasing large-capacity communication, a scheme for providing multi links has been proposed. For example, a carrier aggregation (CA) technique of a long term revolution (LTE) system may provide multi-connections through a plurality of carriers. Therefore, a user may receive a service through more resources.

Hereinafter, the present disclosure will describe a technology for providing a multi-connection in a wireless communication system.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereinafter, for convenience of explanation, the present disclosure uses terms and names that are defined in the 3rd Generation Partnership Project Long Term Evolution (3GPP LTE) and the Institute of Electrical and Electronical Engineers (IEEE) 802.11 standard. However, the present disclosure is not limited to the terms and names but may also be identically applied even to the system according to other standards.

Hereinafter, the present disclosure describes embodiments for using a wireless local area network technology in a cellular communication system to provide a multi-connection. However, other radio access technologies (RATs) in addition to a wireless LAN may be applied.

FIG. 1 is a diagram illustrating an example of the network structure of the wireless communication system according to the embodiment of the present disclosure.

Referring to FIG. 1, the wireless communication system includes a base station A 110-1, a base station B 110-2, a base station C 110-3, mobility management entity (MME)/serving-gateways (S-GWs) 120-1 and 120-2, and an access point (AP) 130. FIG. 1 illustrates three base stations, in which at least two or four base stations may be present. The MME/S-GWs 120-1 and 120-2 may each be separated into the MME and the S-GW.

The base stations 110-1, 110-2, and 110-3 are access nodes of the cellular network and provide a radio access to terminals that are connected to the network. That is, the base stations 110-1, 110-2, and 110-3 support a connection between the terminals and a core network. According to various embodiments of the present disclosure, the base station A 110-1 may use an AP 130 to provide the multi-connection to the terminal.

The MME/S-GWs 120-1 and 120-2 manage mobility of the terminal. Further, the MME/S-GWs 120-1 and 120-2 may further perform authentication, bearer management, etc., on the terminals that are connected to the network. The MME/S-GWs 120-1 and 120-2 process packets arrived from the base stations 110-1, 110-2 and processes packet to be forwarded to the base stations 110-1, 110-2, and 110-3.

The AP 130 is an access node of the wireless LAN network and provides a radio access to the terminals. In particular, according to various embodiments of the present disclosure, the AP 130 may provide a wireless LAN based connection for the multi-connection to the terminal by a control of the base station A 110-1.

According to the embodiment of the present disclosure, the AP 130 may be included in the base station A 110-1 or may be connected to the base station A 110-1 through a separate interface. In this case, the base station A 110-1 may directly transmit some of downlink data to the terminal and transmit the rest of the downlink data to the terminal through the AP 130. Further, the terminal may transmit some of uplink data to the base station A 110-1 and transmit the rest of the uplink data to the AP 130.

The terminal may access the cellular network through the base station A 110-1. According to the embodiment of the present disclosure, the base station A 110-1 may additionally set an access to the AP 150 to the terminal to control the terminal to perform communications in a wider band. In this case, even if core network equipment (for example: MME, S-GW, packet data network gateway (P-GW), etc.) does not recognize that the multi-connection is set by additionally using the AP 150 in a radio section, a service may be provided.

If the multi-connection is provided by the AP 130, there is a need to determine to which of the multi-connections data are transmitted. For example, in the case of the downlink, the base station A 110-1 may receive data from the core network and determine whether to transmit the data to the terminal through the wireless LAN or whether to directly transmit the data to the terminal. Further, in the case of the uplink, the terminal may determine to which path data are transmitted and the terminal may transmit the data to the core network.

Figure 2:
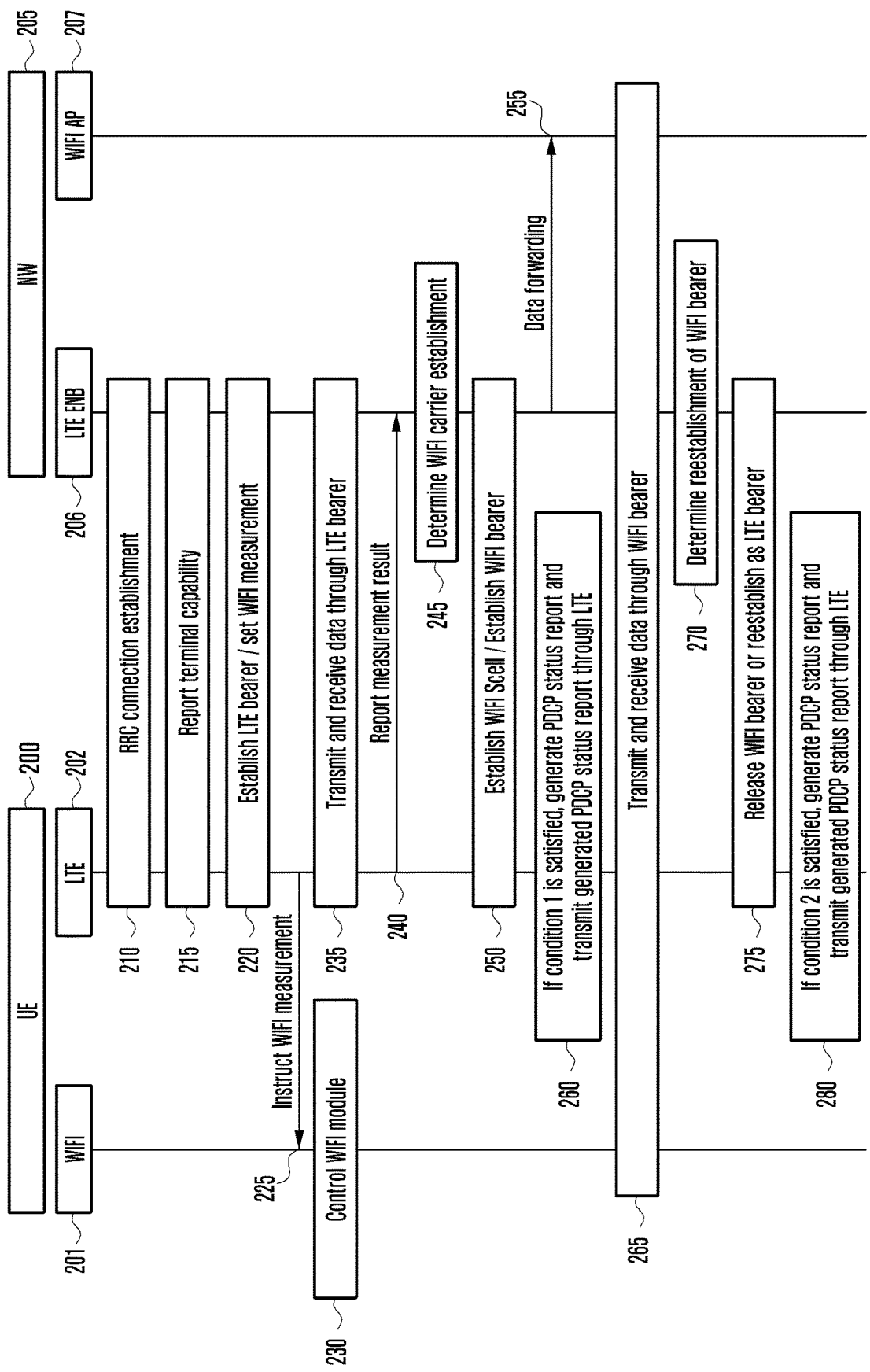
FIG. 2 illustrates a procedure for establishing a connection with an access node providing an additional connection in the wireless communication system according to the embodiment of the present disclosure.

FIG. 2 illustrates a procedure for establishing a connection with an access node providing an additional connection in the wireless communication system according to the embodiment of the present disclosure.

A terminal according to an embodiment of the present disclosure may establish a first bearer corresponding to first communication through the first communication, receive a radio resource control (RRC) control message instructing establishment of a cell for second communication and a second bearer corresponding to a second communication from the base station, set a cell for the second communication based on the RRC control message, confirm a type of the second bearer, and reestablish the first bearer as the second bearer of the confirmed type according to the confirmation result.

In this case, the first communication may be long term evolution (LTE) communication and the second communication may be wireless fidelity (WIFI) communication. The first communication and the second communication may use different frequency bands.

Hereinafter, in the present specification, the first communication and the LTE communication may be used as the same meaning, and the second communication and the WIFI communication may be used as the same meaning.

For convenience, a network 205 is illustrated as one node, but an LTE base station 206 controls only a WIFI AP 207 and the LTE base station 206 and the WIFI AP 207 may be located at the same physical location and located at different physical locations.

The terminal 200 has both a WIFI transceiver 201 and an LTE transceiver 202 and is equipped with an apparatus for operating WIFI as if the WIFI is a part of a radio bearer of the LTE and recognizes the procedure. In the following description, it is referred to as an LTE-WIFI integration technology to operate the WIFI as if the WIFI is a part of the radio bearer of the LTE.

The terminal 200 establishes an RRC connection with the LTE base station 206 at arbitrary timing (210). The RRC connection establishment is performed by performing a process of transmitting, by the terminal 200, a control message called RRCConnectionRequest requesting RRC connection establishment to the LTE base station 206 through a random access procedure, a process of transmitting, by the LTE base station 206, an RRCConnectionSetup message instructing the RRC connection establishment to the terminal 200, and a process of transmitting, by the terminal 200 establishing the RRC connection, to transmit an RRCConnectionSetupComplete message reporting the RRC connection establishment to the LTE base station 206. The terminal 200 having established the RRC connection may perform LTE communication through the LTE base station 206.

The LTE base station 206 and the terminal 200 can perform various types of LTE communications and the terminal 200 reports its own capability to the LTE base station 206 to determine whether to use optional functions such as carrier aggregation and MIMO (215). The UE capability report procedure includes a process of transmitting, by the LTE base station 206, a control message called UECapabilityEnquiry to the terminal 200 and a process of transmitting, by the terminal 200, a control message called UECapabilityInformation to the LTE base station 206.

The UECapabilityEnquiry includes RAT-Type which is information indicating the type of radio access technology (RAT) to be reported by the terminal 200. The RAT-Type indicates one value of GERAN, UTRAN, EUTRAN, and WLAN, and one or more RAT-Type may be indicated in one UECapabilityEnquiry message.

If the RAT-Type is indicated by the WLAN, the terminal 200 reports the following information to the LTE base station 206 by including the following information in the UECapabilityInformation control message.

- List of WIFI channels to which LTE-WIFI integration technology can be applied.
- List of WIFI versions/types to which the LTE-WIFI integration technology can be applied (e.g., 802.11n, 802.11 ad, etc.).
- The number of LTE carrier/LTE serving cells that may be integrated when the LTE-WIFI integration technology is applied.

If only the LTE is used, the number of LTE carriers that may be aggregated may be defined differently for each band combination of LTE, and the information on the number of LTE carriers is reported in the UE capability information for the E-UTRAN. The number of LTE carriers that may be aggregated when the LTE and the WIFI are used together may be different from the number of LTE carriers that may be aggregated when only the LTE is used and may include the information on the number of LTE carrier that may be aggregated in the WLAN capability information when the LTE and the WIFI are used together.

When the LTE-WIFI integration technology is applied, the number of LTE carriers that can be aggregated is signaled as the maximum value commonly applied to all band combinations or a difference value (delta) from the number of carriers that can be aggregated when the only the LTE is used. For example, if only the LTE is used, the terminal reporting that a total of three carriers may be aggregated for a combination of a band X and a band Y and a total of five carriers may be aggregated for a combination of a band X and a band Z reports the maximum value as 4 when the LTE-WIFI integration technology is applied, which means supporting the aggregation of the total of three carriers for the combination of the band X and the band Y but supporting the aggregation of the total of four carriers for the combination of the band X and the band Z. If 1 is reported as the delta, this means that a total of two carrier aggregations support the combination of the band X and the band Y and a total of four carrier aggregations support the combination of the band X and the band Z.

The LTE base station 206 determines whether to apply the LTE-WIFI integration technology to the terminal 20 in consideration of all matters such as the capability of the terminal 200 and the channel condition of the terminal 200. If the LTE base station 206 determines to apply the LTE-WIFI integrated technology, the LTE bearer 206 establishes an LTE bearer with the terminal 200 and performs reconfiguration of the RRC connection with the terminal 200 in order to set the measurement for WIFI. The RRC connection reconfiguration process includes a process of transmitting, by the LTE base station 206, an RRCConnectionReconfiguration control message to the terminal 200 and a process of transmitting, by the terminal 200, an RRCConnectionReconfigurationComplete control message to the LTE base station 206

The RRCConnectionReconfiguration message includes LTE bearer configuration information, WIFI measurement information, or the like. The LTE bearer includes a PDCP device and an RLC device The WIFI measurement information is information on the WIFI to be measured by the terminal 200 and includes WIFI channel information, WIFI type information, identifier information of a WIFI AP, transmission time interval information of a WIFI beacon signal, event information related to a WIFI measurement result report, or the like.

The transmission time interval information of the WIFI beacon signal is information that specifies an approximate time at which the WIFI beacon signal is transmitted and may be represented by a system frame number and a subframe number of the current LTE system.

The transmission time interval of the WIFI beacon signal forms a certain pattern, and the information corresponding to the pattern includes, for example, the system frame number and the sub frame number specifying starting timing of the WIFI beacon transmission time interval, information specifying a length of the WIFI beacon transmission time interval (e.g., several sub-frames), information specifying a period of the WIFI beacon transmission time interval, and the like.

The WIFI measurement result event may be defined to report the measured result if the WIFI beacon signal having channel quality equal to or greater than a predetermined criterion is continuously received n times or more in measuring the channel quality of the WIFI beacon signal transmitted by the WIFI AP designated as a measurement target. The n may be defined as one value in the specification or may be indicated in the WIFI measurement information. The n may be directly indicated, or may be derived from a predetermined period (time to trigger) at which the WIFI channel quality should be maintained at a predetermined level.

For example, if the WIFI beacon period is x ms and the time to trigger is y ms, then n may be derived from a value obtained by dividing y by x.

If the terminal 200 is instructed to measure the WIFI, the terminal 200 transmits the WIFI measurement information to the WIFI module 201 and instructs the measurement of the WIFI signal (225). If the WIFI module 201 is already driven at the timing, the terminal 200 controls the driving WIFI module 201 to receive the beacon signal from the instructed WIFI channel at least during the WIFI beacon transmission period. If the WIFI module 201 is not driven at the timing, the terminal 200 first starts driving (i.e., turns on) the WIFI module 201 and controls the WIFI module 201 to perform the above operation (230).

The terminal 200 transmits/receives data to and from the LTE base station 206 using the LTE radio and the LTE bearer while the WIFI module 201 performs the measurement for the WIFI signal (235).

The LTE base station 206 transmits all the downlink data to the terminal 200 using the LTE radio and the LTE bearer.

If the reception quality of the WIFI beacon signal measured at arbitrary timing satisfies the predetermined criterion, the terminal 200 generates a measurement result report control message and transmits the generated measurement result report control message to the LTE base station 206 (240). The control message includes information such as the identifier of the AP, the identifier of the WIFI channel, and the WIFI signal quality at which the beacon signal reception quality satisfies the predetermined criterion.

The LTE base station 206 determines that the WIFI carrier (or a WIFI serving cell, a WIFI secondary cell, or a WIFI SCell) to the terminal 200 is established in consideration of all matters such as the WIFI channel quality, the amount of traffic of the terminal 200, and the load of the current LTE cell (245).

The LTE base station 206 and the terminal 200 perform an RRC connection reconfiguration process for establishing a WIFI bearer and a WIFI SCell.

The RRCConnectionReconfiguration control message includes the following information.

Information specifying the WIFI SCell (for example, WIFI channel information and AP identifier information)

WIFI bearer configuration information. (This is information on the bearer that transmits/receives data through the WIFI SCell, and a new WIFI bearer may be established and the existing LTE bearer may also be established as the WIFI bearer.)

In the present disclosure, there are four kinds of WIFI bearers (a type 1 WIFI bearer, a type 2 WIFI bearer, a type 3 WIFI bearer, and a type 4 WIFI bearer).

The type 1 WIFI bearer is operated only in a radio link control (RLC) unacknowledged mode (UM), and is a unidirectional bearer in which data are transmitted/received only in the downlink.

The type 2 WIFI bearer is operated in one of the RLC acknowledged mode (AM) and the RLC UM mode and is a bidirectional bearer in which the downlink transmits/receives data through one of the LTE or the WIFI in the downlink and the uplink transmits/receives data in a wireless manner different from the downlink.

The type 3 WIFI bearer is operated in either RLC AM or RLC UM mode, and a bidirectional bearer in which the downlink transmits/receives data through both of the LTE and the WIFI and the uplink transmits/receives data only by one of the LTE or the WIFI.

The type 4 WIFI bearer is operated in either the RLC AM or the RLC UM and is a bidirectional bearer in which both of the downlink and the uplink transmit/receive data through both of the LTE and the WIFI.

The WIFI bearer configuration information includes information (e.g., bearer identifier information) specifying the bearer that is reestablished as the WIFI bearer from the LTE bearer, the type information of the WIFI bearer, and the like.

The LTE base station 206 transmits the downlink data to be transmitted through the WIFI to the WIFI AP 207 (255).

If the terminal 200 establishes the WIFI SCell and the terminal 200 determines whether the following condition 1 is satisfied if the WIFI bearer is set.

[Condition 1]

If the WIFI bearer type is a type 2 WIFI bearer and the WIFI bearer is operated in the RLC AM or the LTE bearer is operated in the RLC AM, then the condition 1 is satisfied among the WIFI bearers reconfigured (or reestablished) in the LTE bearer.

The reconfiguration (or reestablishment) as the type 2 WIFI bearer from the LTE bearer means that a loss of the LTE bearer data may occur. Therefore, if the condition 1 is satisfied, the terminal 200 generates a PDCP status report and transmits the generated PDCP status report (260). The base station receiving the PDCP status report transmits a PDCP PDU to the WIFI AP so that the PDCP PDUs specified as not yet received in the PDCP status report are retransmitted.

The terminal 200, the WIFI AP 207, and the LTE base station 206 transmit/receive data through the WIFI bearer (265).

The LTE base station 206 decides to reestablish the WIFI bearer at the arbitrary timing. The case where the terminal is out of the WIFI area and does not WIFI communication any more, or the reason why the amount of data to be transmitted/received through the WIFI bearer is suddenly reduced and there is no reason to maintain the WIFI bearer will be described by way of example.

The LTE base station 206 and the terminal 200 perform the RRC connection reconfiguration process for the WIFI bearer reestablishment. The RRCConnectionReconfiguration control message includes the information (for example, bearer identifier) specifying the WIFI bearer that is to be released or reestablished as the LTE bearer.

If the terminal 200 reestablishes the WIFI bearer as the LTE bearer, it determines whether the condition 2 is satisfied.

[Condition 2]

[Condition 2] If the type 2 WIFI bearer, the type 3 WIFI bearer, or the type 4 WIFI bearer are reestablished as the LTE bearer operated in the RLC AM, the condition 2 is satisfied.

The reestablishment of the type 2, type 3, or type 4 WIFI bearer as the LTE bearer means that the loss of data may occur. Therefore, if the condition 2 is satisfied, the terminal generates the PDCP status report and transmits the generated PDCP status report through the LTE (280).

Figure 3:
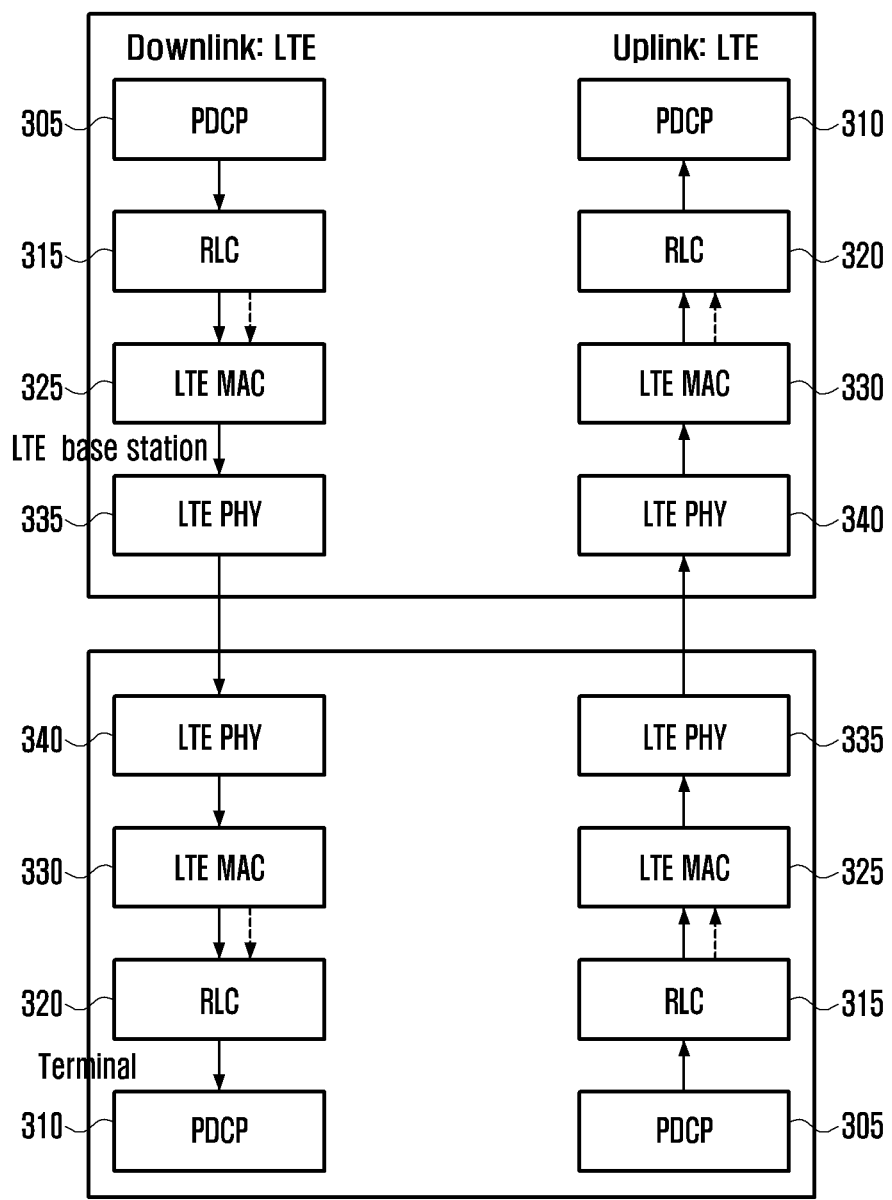
FIG. 3 is a diagram illustrating an LTE bearer structure of the wireless communication system according to the embodiment of the present disclosure.

FIG. 3 is a diagram illustrating an LTE bearer structure of the wireless communication system according to the embodiment of the present disclosure.

The LTE bearer includes the PDCP device and the RLC device, and the LTE bearer is connected to an MAC device of the LTE. A PDCP transmitting apparatus 305 ciphers the PDCP SDU and converts the ciphered PDCP SDU into the PDCP PDU and transmits the PDCP PDU to a lower layer. The PDCP receiving apparatus 310 deciphers the PDCP PDU transmitted by the lower layer and reconfigures the deciphered PDCP PDU as the PDCP SDU.

The RLC transmitting apparatus 315 divides or concatenates the PDCP PDUs into a size suitable for transmission over a radio channel, reconfigures the PDCP PDUs as the RLC PDUs and transmits the RLC PDUs to the lower layer. In addition, the data loss is prevented by the ARQ operation. In order to perform the ARQ operation, the RLC receiving apparatus and the RLC transmitting apparatus transmits/receive a control message called an RLC STATUS PDU. The RLC control message is indicated by a blue dotted line.

The RLC receiving apparatus 320 arranges the RLC PDUs transmitted by the lower layer in order according to an RLC number, and generates an RLC STATUS PDU for the non-received RLC PDU and requests a retransmission of the generated RLC STATUS PDU to the RLC transmitting apparatus. The reordered RLC PDUs are reassembled into the PDCP PDUs to be transmitted to the PDCP receiving apparatus.

The MAC transmitting apparatus 325 is connected to a plurality of bearers, multiplexes the RLC PDUs transmitted from each bearer into one MAC PDU and transmits the multiplexed RLC PDUs to a PHY transmitting apparatus. The MAC receiving apparatus 330 demultiplexes the RLC PDUs in the MAC PDU received from the PHY receiving apparatus and then transmits the demultiplexed RLC PDUs to the RLC receiving apparatus of the appropriate bearer.

The PHY transmitting apparatus 335 and the PHY receiving apparatus 340 transmit/receive the MAC PDU using a LTE radio transmission scheme.

Hereinafter, a structure of various types of WIFI bearers will be described with reference to FIGS. 4A to 4D. The WIFI bearer basically includes one PDCP device, LTE L1/L2 devices, and WIFI L1/L2 devices.

The LTE L1/L2 devices include RLC, LTE MAC, and LTE PHY devices, and the WIFI L1/L2 devices include LLC/SNAP, WIFI MAC, WIFI PHY and auxiliary RLC devices.

The RLC may or may not be set in the WIFI L1/L2. Since the WIFI MAC protocol itself provides a basic ARQ function, it is preferable not to set the RLC for a service that does not require highly reliable communication but set the RLC for a service that requires highly reliable communication.

The WIFI PHY transmitting apparatus and the WIFI PHY receiving apparatus transmit/receive data using the WIFI radio. The WIFI MAC transmitting apparatus and the WIFI MAC receiving apparatus transmit/receive WIFI MAC PDU using the WIFI MAC protocol. The WIFI MAC PDU is used to transmit/receive user data or to exchange a control message for WIFI management, for example WIFI association. A red dotted line in the following drawings indicates the WIFI control message. A logical link control (LLC)/sub network access protocol (SNAP) is responsible for an interface between a higher layer and the MAC. In particular, if multiple WIFI bearers are set, it is possible to specify which WIFI bearer data the corresponding packet is by using a specific field of the SNAP, for example, an unused value of a Type field. A mapping relationship between the unused value of the Type field and the WIFI bearer may be set in the RRC connection reconfiguration step 260.

Figure 4A:
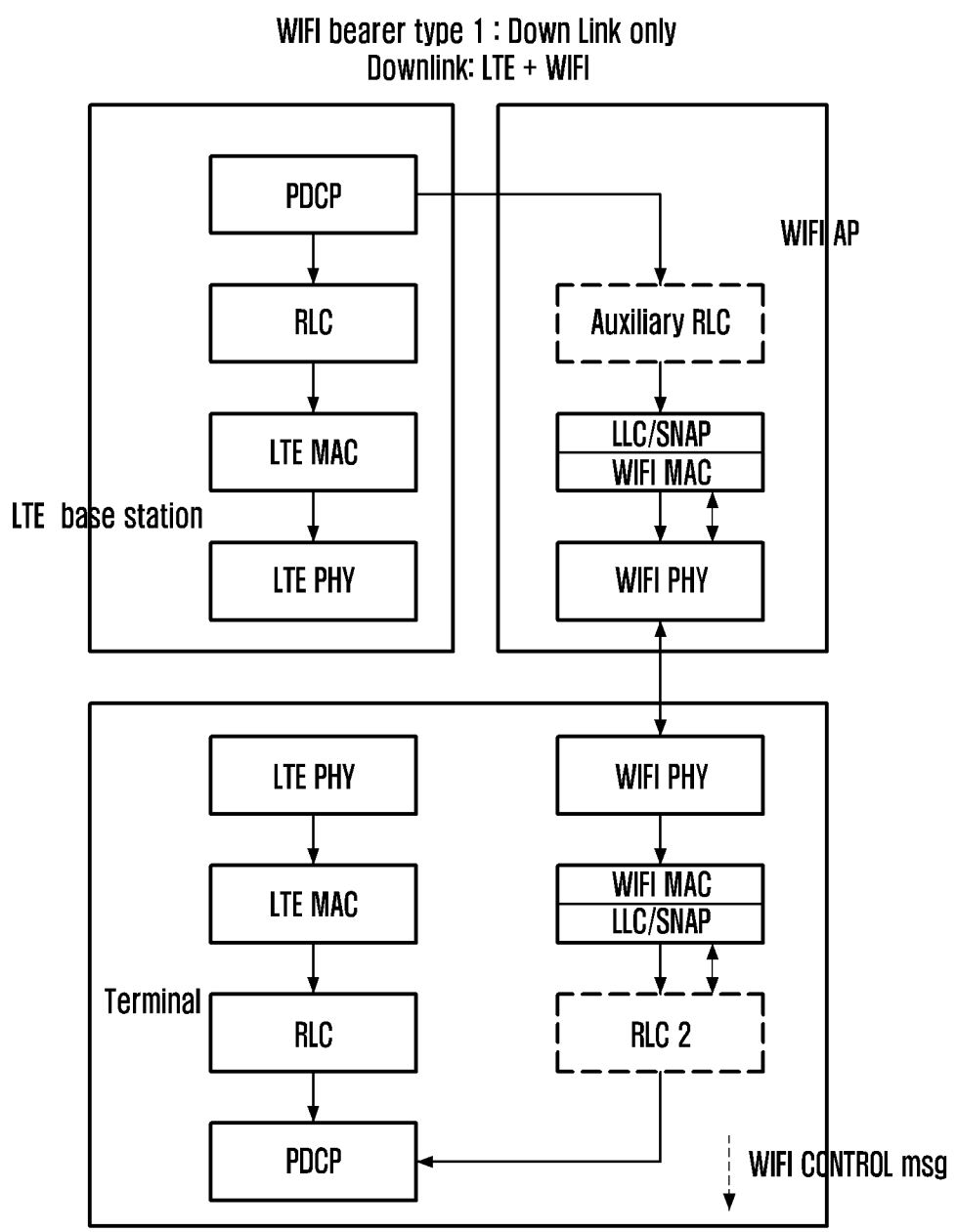
FIG. 4A is a diagram illustrating an example of a type 1 WIFI bearer structure in the wireless communication system according to the embodiment of the present disclosure.

FIG. 4A is a diagram illustrating an example of a type 1 WIFI bearer structure in the wireless communication system according to the embodiment of the present disclosure.

The type 1 WIFI bearer is a unidirectional bearer capable of only downlink transmission and reception, and is applicable to a service including only downlink traffic such as a streaming service.

In the type 1 WIFI bearer, one PDCP device is connected to the LTE L1/L2 devices and the WIFI L1/L2 devices, and the RLC of the LTE L1/L2 devices and the RLC of the WIFI L1/L2 devices are driven in the RLC UM (unacknowledged mode, standardization 36.322). Therefore, the RLC STATUS PDU is not transmitted.

If it is the type 1 WIFI bearer, the WIFI MAC device of the terminal does not transmit user data but may transmit the WIFI control message. Therefore, not only the downlink signal but also the uplink signal may be transmitted/received through the WIFI radio. Since the size and the transmission frequency of the WIFI control message are remarkably small and low compared to the size and transmission frequency of the user data, the amount of the downlink signal is significantly larger than the amount of the uplink signal.

Figure 4B:
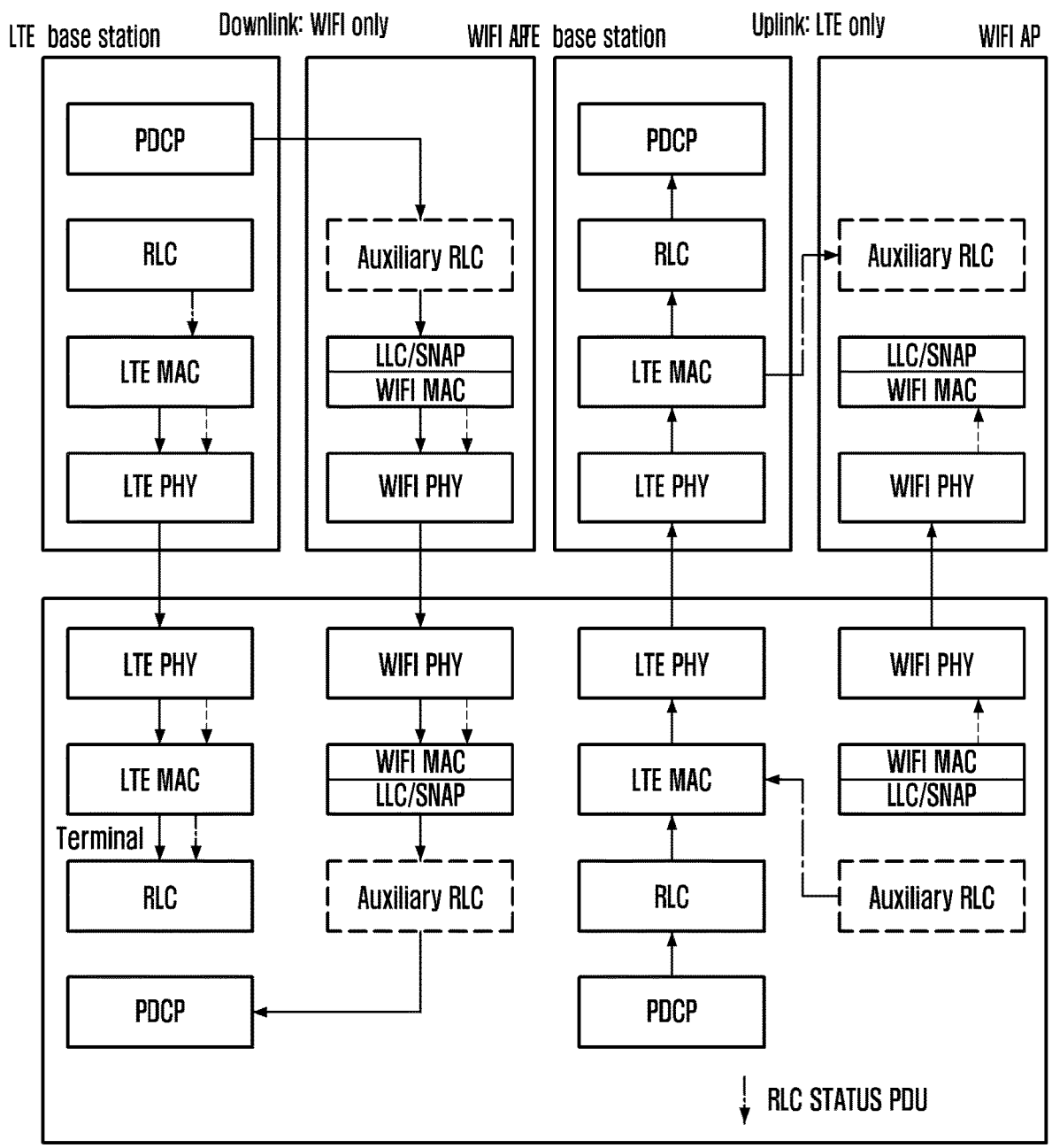
FIG. 4B is a diagram illustrating an example of a type 2 WIFI bearer structure in a wireless communication system according to an embodiment of the present disclosure.

FIG. 4B is a diagram illustrating an example of a type 2 WIFI bearer structure in a wireless communication system according to an embodiment of the present disclosure.

The type 2 WIFI bearer is a bidirectional bearer capable of both uplink and downlink transmission/reception, and the downlink is transmitted/received through one of the LTE L1/L2 devices or the WIFI L1/L2 devices, and the uplink is transmitted/received through the rest unused devices which are not used in the downlink among the LTE L1/L2 devices and the WIFI L1/L2 devices. Which one of the LTE L1/L2 or the WIFI L1/L2 is used in the downlink may be instructed in step 260 or may be predetermined in the specification. Considering that the downlink traffic is usually larger due to the asymmetric nature of traffic, it is desirable to transmit the downlink data through the WIFI in most cases. Therefore, if the type 2 WIFI bearer is not particularly specified, the downlink performs transmission/reception through the WIFI L1/L2 and the uplink performs transmission/reception through the LTE L1/L2.

In the type 2 WIFI bearer, the reason of performing, by the uplink, the transmission/reception through the LTE L1/L2 is to minimize the WIFI uplink signal. The uplink is a signal transmitted to the AP by the terminal and is subject to the limitation of listen before talk (LBT), whereas a collision occurring between the LTE uplink and the WIFI uplink may cause a problem in the uplink transmission output control.

The downlink transmission operation of the type 2 WIFI bearer is as follows. The PDCP transmitting apparatus of the base station transmits the PDCP PDU to the auxiliary RLC device or the LLC/SNAP device of the AP, and the AP multiplexes the PDCP PDU into the WIFI MAC PDU and transmits the multiplexed PDCP PDU to the WIFI L1/L2 of the terminal. The WIFI L1/L2 of the terminal demultiplexes the RLC PDU (if the auxiliary RLC is set) or the PDCP PDU in the WIFI MAC PDU and transmits the demultiplexed RLC PDU or PDCP PDU to the auxiliary RLC device or the PDCP device. If the auxiliary RLC device is set, the auxiliary RLC device of the terminal generates an RLC STATUS PDU. At this time, since the WIFI bearer prohibits the uplink transmission through the WIFI, the RLC STATUS PDU is transmitted through the LTE L1/L2 device. In other words, the RLC STATUS PDU is transmitted to the LTE MAC, and the LTE MAC transmitting apparatus multiplexes the RLC STATUS PDU into the MAC PDU and transmits the multiplexed RLC STATUS PDU. The LTE MAC receiving apparatus of the LTE base station transmits the RLC STATUS PDU transmitted from the MAC PDU to the auxiliary RLC device to the auxiliary RLC device of the WIFI AP.

In summary, the auxiliary RLC device of a type 2 WIFI bearer of the terminal receives the RLC DATA PDU through the WIFI and transmits the RLC STATUS PDU through the LTE.

The LTE MAC device of the type 2 WIFI bearer of the terminal applies a logical channel identifier (LCID) (see the specification 36.321) that agrees in advance, and transmits the RLC STATUS PDU to the LTE base station. At this time, the LCID for the RLC STATUS PDU needs to use a new value, not the LCID allocated to the RLC of the LTE L1/L2 and the base station determines which LCID is used and informs the terminal of the determined LCID in 260.

The uplink transmission operation is as follows. The PDCP transmitting apparatus of the terminal transmits the PDCP PDU to the RLC of the LTE L1/L2, and the LTE L1/L2 transmit the RLC PDU to the base station through a normal procedure. When receiving the RLC PDU, the RLC device of the base station performs a predetermined process, reassembles the RLC PDU into the RLC SDU, transmits the RLC PDU to the PDCP receiving apparatus, generates the RLC STATUS PDU, or stores the RLC PDU in a buffer.

The base station RLC device transmits the generated RLC STATUS PDU through the LTE or the WIFI. If it is transmitted through the WIFI L1/L2, the RLC device of the base station forwards the RLC STATUS PDU to the WIFI AP, and the WIFI AP transmits the RLC STATUS PDU to the terminal. The LLC/SNAP of the terminal WIFI L1/L2 transmit the RLC STATUS PDU to the RLC device, not the auxiliary RLC device.

When the RLC STATUS PDU is transmitted through the LTE, the RLC STATUS PDU may be transmitted as if the general RLC DATA PDU is transmitted.

In summary, the RLC device of the type 2 WIFI bearer of the terminal transmits the RLC DATA PDU through the LTE and receives the RLC STATUS PDU through the LTE or the WIFI.

The type 2 WIFI bearer has the following features. The downlink PDCP PDU is transmitted/received through the WIFI L1/L2, and the uplink PDCP PDU is transmitted/received through the LTE L1/L2. The downlink RLC DATA PDU is transmitted/received through the WIFI L1/L2, and the uplink RLC DATA PDU is transmitted/received through the LTE L1/L2. The RLC STATUS PDU for the downlink RLC DATA PDU is transmitted/received through the LTE L1/L2, and the RLC STATUS PDU for the uplink RLC DATA PDU is transmitted/received through the LTE L1/L2 or transmitted/received through the WIFI L1/L2.

The type 2 WIFI bearer is characterized in that the uplink and downlink are transmitted/received through different radio access technologies. As a modification thereof, the WIFI bearer which is transmitted/received only through the WIFI in both the uplink and the downlink may be considered, and this is called a type 2-1 WIFI bearer. Note that the operations of the terminal of FIGS. 5 and 6 described for the type 2 WIFI bearer are equally applied to a type 2-1 WIFI bearer.

Figure 4C:
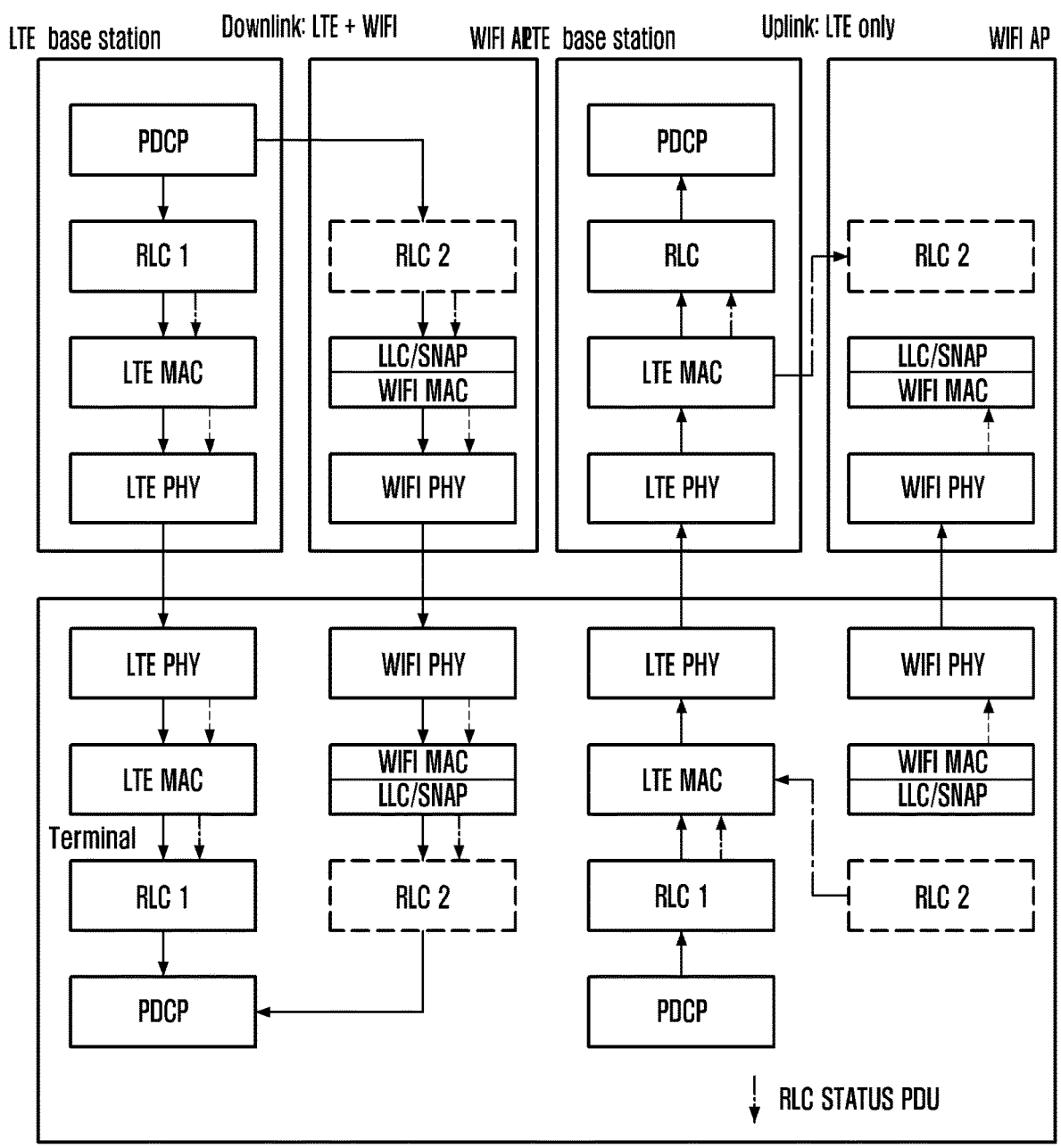
FIG. 4C is a diagram illustrating an example of a type 3 WIFI bearer structure in the wireless communication system according to the embodiment of the present disclosure.

FIG. 4C is a diagram illustrating an example of a type 3 WIFI bearer structure in the wireless communication system according to the embodiment of the present disclosure.

The type 3 WIFI bearer is a bidirectional bearer capable of both uplink and downlink transmission/reception, and the downlink is transmitted/received through both of the LTE L1/L2 devices and the WIFI L1/L2 devices, and the uplink is transmitted/received through one of them. Which one of the LTE L1/L2 or the WIFI L1/L2 is used in the downlink may be instructed in step 260 or may be predetermined in the specification. The type 3 WIFI bearer is advantageous in that it can enjoy a higher downlink data transmission rate compared to the type 2 WIFI bearer.

Figure 4D:
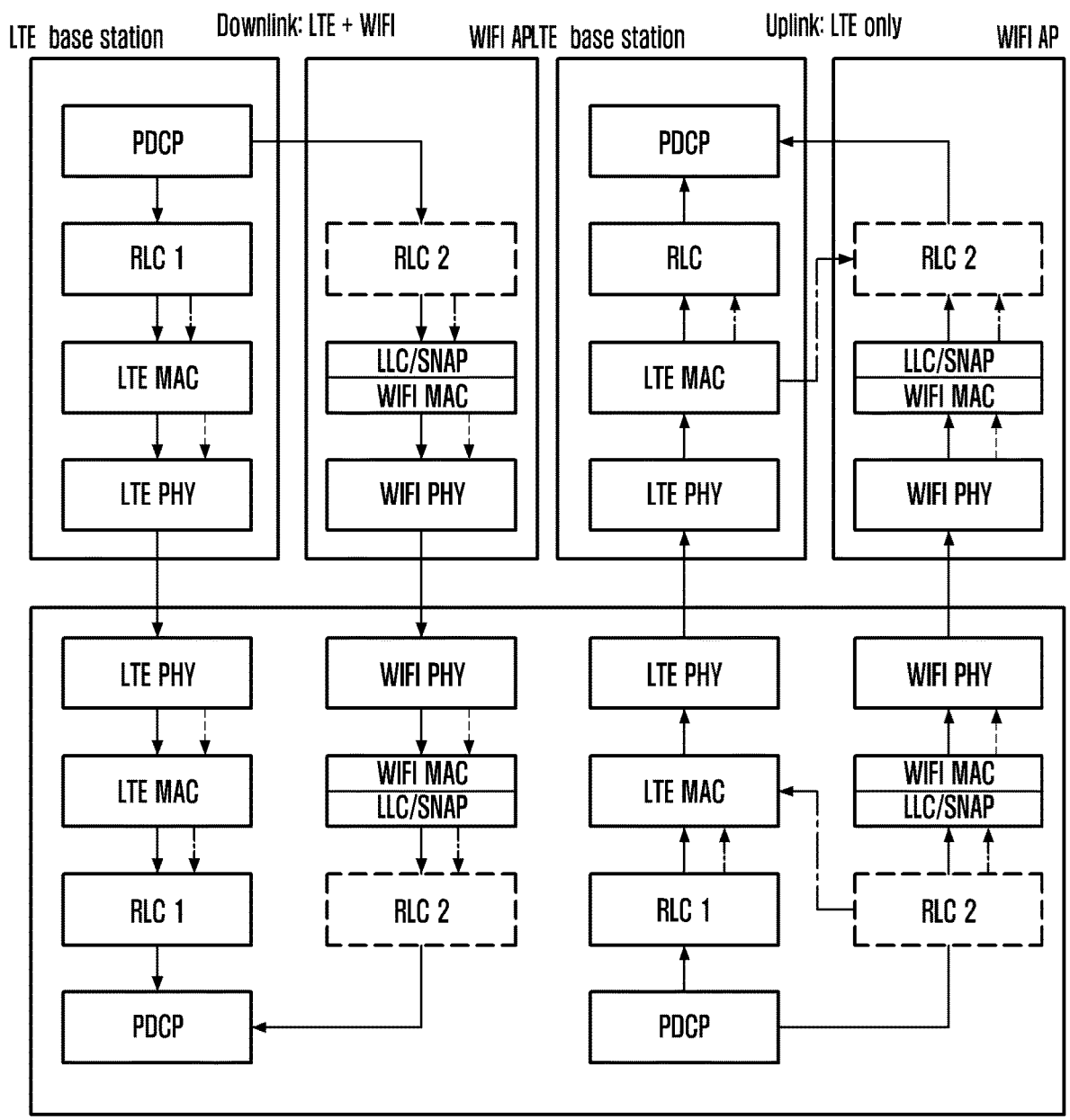
FIG. 4D is a diagram illustrating an example of a type 4 WIFI bearer structure in a wireless communication system according to an embodiment of the present disclosure.

FIG. 4D is a diagram illustrating an example of a type 4 WIFI bearer structure in a wireless communication system according to an embodiment of the present disclosure.

The type 4 WIFI bearer is a bidirectional bearer capable of both uplink and downlink transmission/reception, and both of the downlink and the uplink are transmitted/received through both of the LTE L1/L2 devices and both of the WIFI L1/L2 devices. The type 4 WIFI bearer is advantageous in that it can enjoy a higher uplink data transmission rate compared to the type 3 WIFI bearer.

In the case of the type 3 WIFI bearer and the type 4 WIFI bearer, the PDCP receiving apparatus of the terminal needs to reorder the PDCP PDUs received through the WIFI L1/L2 devices and the LTE L1/L2 devices. The reordering may be performed on a timer basis.

For example, if the PDCP PDU whose order is not aligned is generated, a predetermined timer is driven and if the order is not aligned until the timer expires, it is determined that the order of PDCP PDUs whose order is not aligned is not likely to be aligned and the PDCP PDUs are transmitted to the higher layer. The fact that the order of any PDCP PDUs is not aligned means that there is a non-received PDCP PDU having a serial number lower than a serial number of the PDCP PDU.

Figure 5:
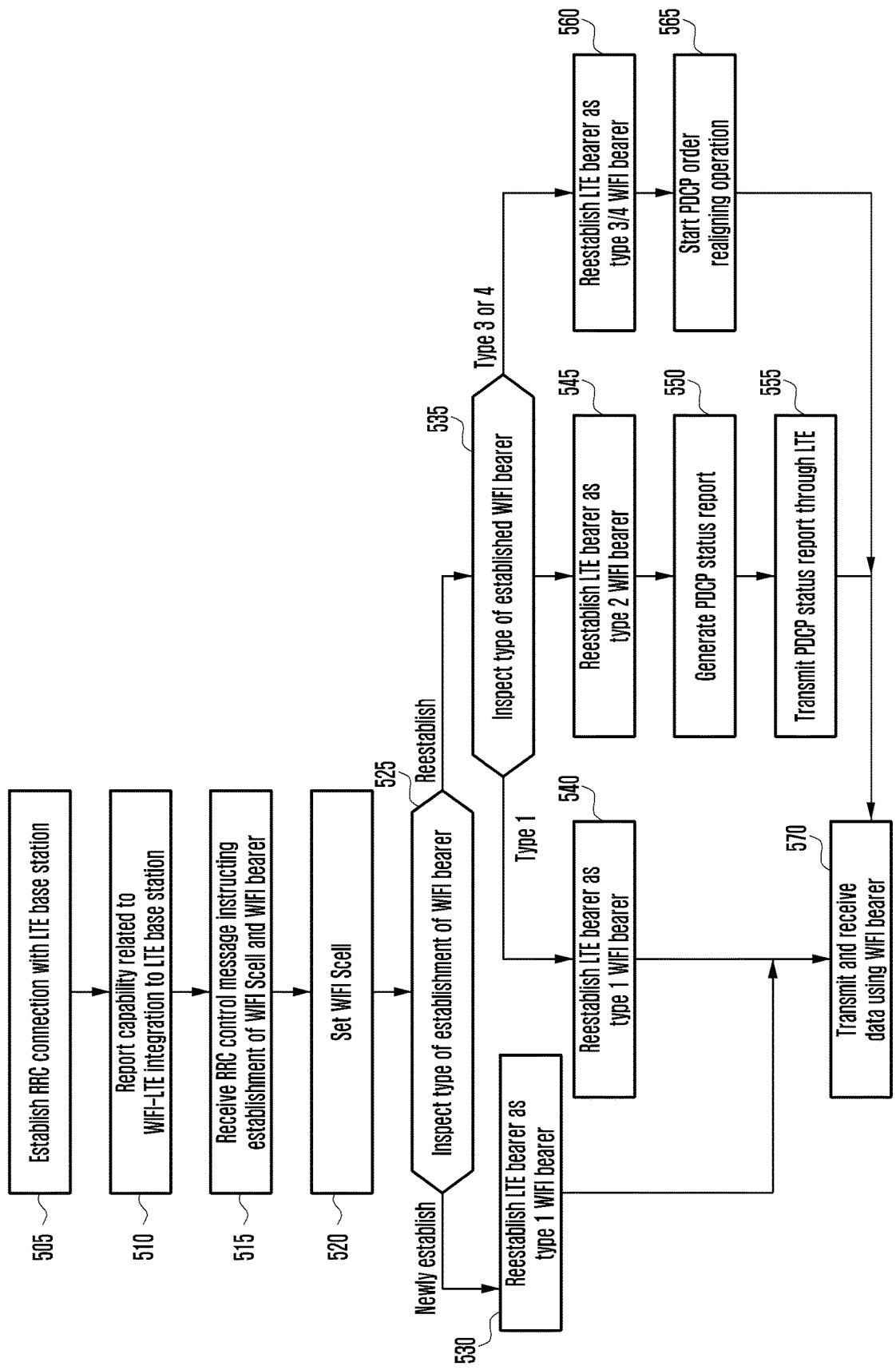
FIG. 5 is a diagram illustrating an operation of a terminal according to an embodiment of the present disclosure.

FIG. 5 is a diagram illustrating an operation of a terminal according to an embodiment of the present disclosure.

In step 505, the terminal establishes the WIFI connection with the LTE base station.

In step 510, the terminal performs the UE capability report process with the LTE base station. The terminal reports its own capability related to the LTE-WIFI integration to the LTE base station.

In step 515, the terminal receives the RRC control message instructing that at least one WIFI SCell is established from the LTE base station and at least one WIFI bearer is established.

In step 520, the terminal establishes a WIFI SCell according to the instruction from the base station and the operation of the terminal proceeds to step 525 to check the type of WIFI bearer establishment.

If the existing LTE bearer is reestablished as the WIFI bearer, the operation of the terminal proceeds to step 535, and if the WIFI bearer is newly established, the operation of the terminal proceeds to step 530.

In step 530, the terminal establishes the WIFI bearer of the type instructed by the base station, and the operation of the terminal proceeds to step 570. In this case, the terminal applies the PDCP sequence reordering operation if the type of newly established WIFI bearer is type 3 or type 4.

In step 535, the terminal checks the type of the newly established WIFI bearer. If the type of newly established WIFI bearer is type 1, the operation of the terminal proceeds to step 540, if it is type 2, the operation of the terminal proceeds to step 545, and if it is type 3 or 4, the operation of the terminal proceeds to step 560.

In step 540, the terminal reestablishes a predetermined LTE bearer as a type 1 WIFI bearer, and then the operation of the terminal proceeds to step 570. Reestablishing the predetermined LTE bearer as the type 1 WIFI bearer means connecting the WIFI L1/L2 devices with the PDCP device and removing the LTE RLC device while maintaining the PDCP device.

In step 545, the terminal reestablishes a predetermined LTE bearer as a type 2 WIFI bearer, and then the operation of the terminal proceeds to step 550. Reestablishing the LTE bearer as the type 2 WIFI bearer means connecting the WIFI L1/L2 devices with the PDCP device while the PDCP device and the LTE L1/L2 devices are maintained. Reestablishing the LTE bearer as the type 2-1 WIFI bearer means removing the LTE RLC and connecting the WIFI L1/L2 devices with the PDCP device while the PDCP device is maintained.

In step 550, the terminal generates a PDCP status report, and the operation of the terminal proceeds to step 555 to transmit the PDCP status report through the LTE L1/L2 devices and proceeds to step 570. If it is the type 2-1 WIFI bearer, the terminal may transmit the PDCP status report to the WIFI L1/L2. The PDCP status report consists of an FMS field and a bitmap, and the details thereof are described in specification 36.323.

In step 560, the terminal reestablishes a predetermined LTE bearer as a type 3 or type 4 WIFI bearer, and then the operation of the terminal proceeds to step 565. Reestablishing the LTE bearer as the type 3 or type 4 WIFI bearer means connecting the WIFI L1/L2 devices with the PDCP device while the PDCP device and the LTE L1/L2 devices are maintained.

In step S565, the terminal starts the PDCP sequence reordering operation and the operation of the terminal proceeds to step 570. Starting the PDCP sequence reordering operation means an operation of determining whether to perform the sequence reordering by checking a sequence number of the PDCP PDUs received through the LTE L1/L2 and the WIFI L1/L2 and an operation of waiting for the PDCP PDUs that are not ordered until the order of the PDCP PDUs is aligned without being transmitted to the higher layer for at least a predetermined time.

In step 570, the terminal transmits/receives data using the newly established or reestablished WIFI bearer.

Figure 6:
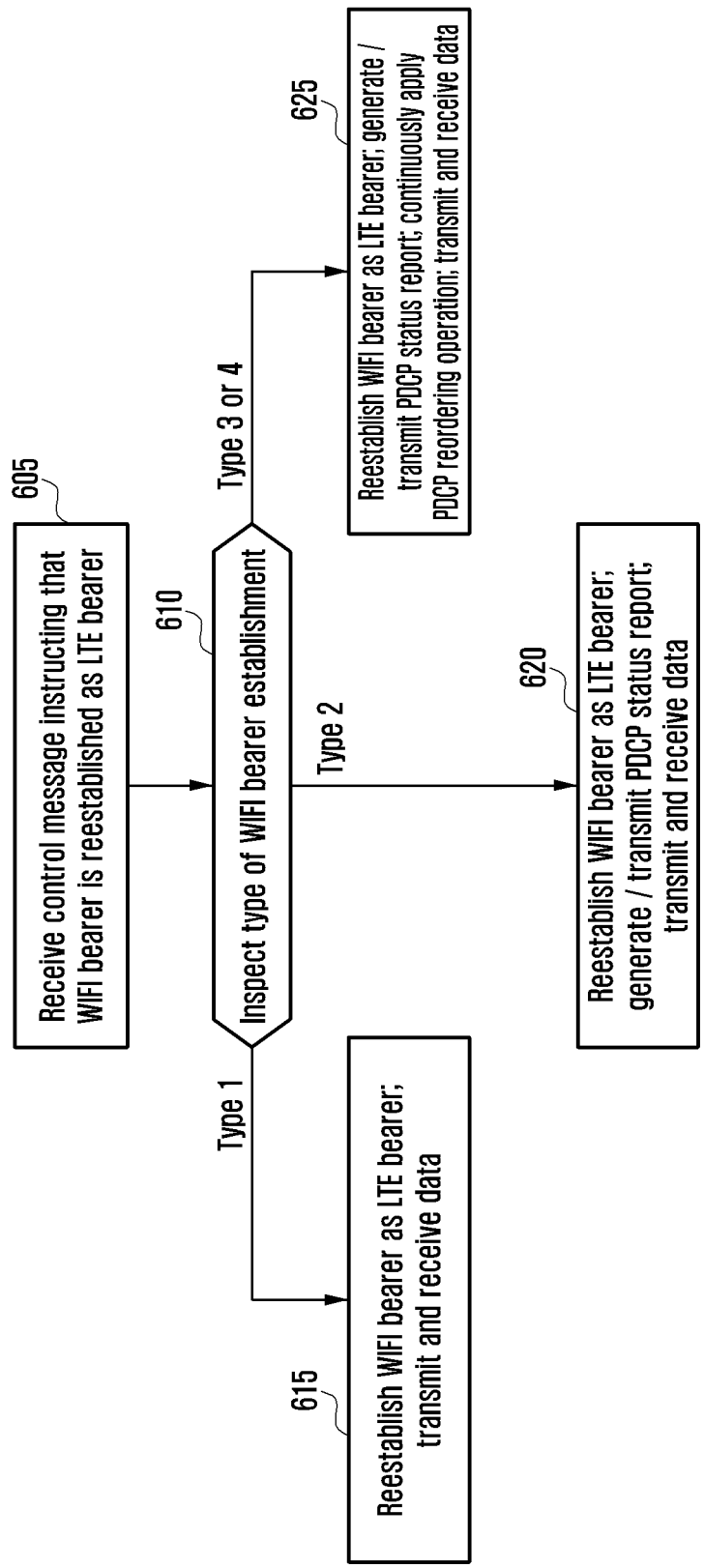
FIG. 6 is a diagram illustrating an operation of a terminal according to another embodiment of the present disclosure.

FIG. 6 is a diagram illustrating an operation of a terminal according to another embodiment of the present disclosure.

In step 605, the terminal receives the control message instructing to reestablish the WIFI bearer as the LTE bearer.

In step 610, the terminal checks the type of the WIFI bearer reestablished as the LTE bearer, and thus the operation of the terminal may perform the next step according to the type. If the type of the WIFI bearer is the type 1, the terminal performs step 615, if the type of the WIFI bearer is the type 2, the terminal performs step 620, and if the type of the WIFI bearer is the type 3 or the type 4, the terminal performs step 625.

In step 615, the terminal reestablishes the instructed WIFI bearer as the LTE bearer and transmits/receives data through the reestablished LTE bearer. Reestablishing the type 1 WIFI bearer as the LTE bearer means releasing the connection between the PDCP and the WIFI L1/L2, generating the LTE RLC device, and then connecting the LTE RLC device with the PDCP.

In step 625, the terminal reestablishes the instructed WIFI bearer as the LTE bearer, generates the PDCP status report, and then transmits the generated PDCP status report through the LTE L1/L2. Data are transmitted/received through the reestablished LTE bearer. Reestablishing the type 2 WIFI bearer as the LTE bearer means releasing the connection between the PDCP and the WIFI L1/L2.

In step 625, the terminal reestablishes the instructed WIFI bearer as the LTE bearer, generates the PDCP status report, and then transmits the generated PDCP status report through the LTE L1/L2. Data are transmitted/received through the reestablished LTE bearer. At this time, the terminal continuously applies the PDCP sequence reordering operation currently in progress in the PDCP device of the LTE bearer until a predetermined event is generated. The predetermined event may be, for example, the case in which the PDCP is reestablished (handover, etc.). Reestablishing the type 3 or type 4 WIFI bearer as the LTE bearer means releasing the connection between the PDCP and the WIFI L1/L2.

Figure 7:
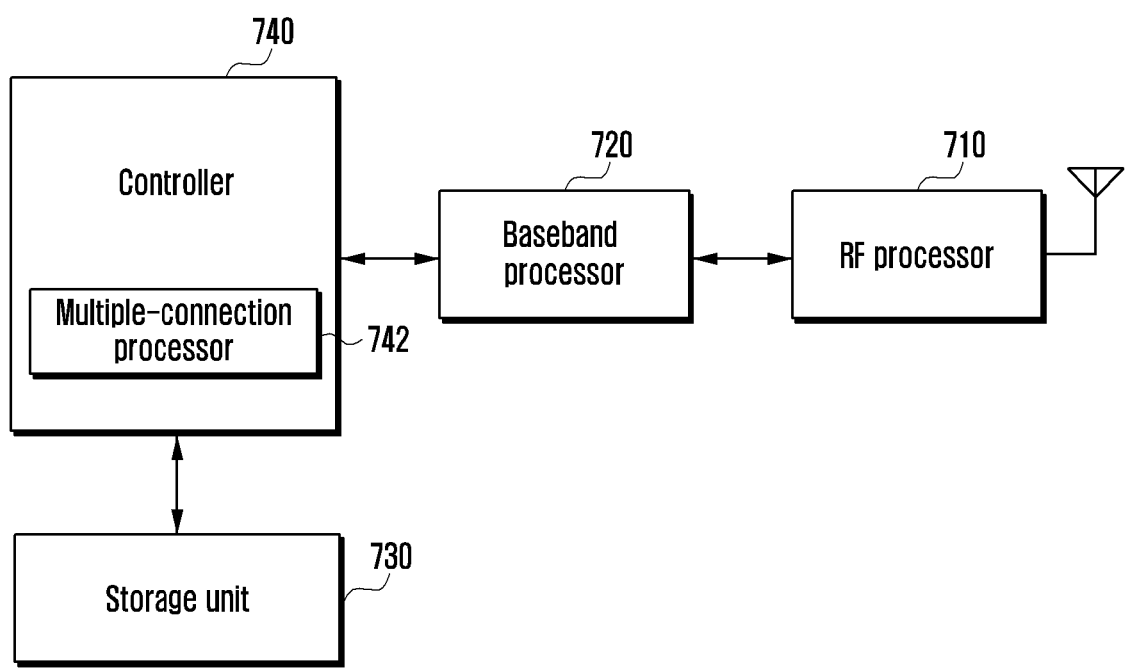
FIG. 7 is a block diagram of the terminal in the wireless communications system according to the embodiment of the present disclosure.

FIG. 7 is a block diagram of the terminal in the wireless communications system according to the embodiment of the present disclosure.

Referring to FIG. 7, the terminal includes a radio frequency (RF) processor 710, a baseband processor 720, a storage unit 730, and a controller 740.

The RF processor 710 serves to transmit/receive a signal through a radio channel, such as band conversion and amplification of a signal. That is, the RF processor 710 up-converts a baseband signal provided from the baseband processor 720 into an RF band signal and then transmits the baseband signal through an antenna, and down-converts the RF band signal received through the antenna into the baseband signal. For example, the RF processor 710 may include a transmitting filter, a receiving filter, an amplifier, a mixer, an oscillator, a digital to analog converter (DAC), an analog to digital converter (ADC), or the like. FIG. 7 illustrates only one antenna but the terminal may include a plurality of antennas. Further, the RF processor 710 may include a plurality of RF chains. Further, the RF processor 710 may perform beamforming. For the beamforming, the RF processor 710 may adjust a phase and a size of each of the signals transmitted/received through a plurality of antennas or antenna elements.

The baseband processor 720 performs a conversion function between the baseband signal and a bit string according to a physical layer standard of the system. For example, when data are transmitted, the baseband processor 720 generates complex symbols by coding and modulating a transmitting bit string. Further, when data are received, the baseband processor 720 recovers the receiving bit string by demodulating and decoding the baseband signal provided from the RF processor 710. For example, according to the orthogonal frequency division multiplexing (OFDM) scheme, when data are transmitted, the baseband processor 720 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 720 divides the baseband signal provided from the RF processor 1410 in an OFDM symbol unit and recovers the signals mapped to the sub-carriers by a fast Fourier transform (FFT) operation, and then recovers the receiving bit string by the modulation and decoding.

The baseband processor 720 and the RF processor 710 transmit/receive a signal as described above. Therefore, the baseband processor 720 and the RF processor 710 may be called a transmitter, a receiver, a transceiver, or a communication unit. Further, at least one of the baseband processor 720 and the RF processor 710 may include a plurality of communication modules to support a plurality of different radio access technologies. Further, at least one of the baseband processor 720 and the RF processor 710 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2.5 GHz, 5 GHz) band, a millimeter wave (for example: 60 GHz) band.

The storage unit 730 stores data such as basic programs, application programs, and configuration information for the operation of the terminal. In particular, the storage unit 730 may store information associated with a second access node performing wireless communication using a second access technology. Further, the storage unit 730 provides the stored data according to the request of the controller 740.

The controller 740 controls the overall operations of the terminal. For example, the controller 740 transmits/receives a signal through the baseband processor 720 and the RF processor 710. In addition, the controller 740 records data in the storage unit 740 and reads the data. For this purpose, the controller 740 may include at least one processor. For example, the controller 740 may include a communication processor (CP) performing a control for communication and an application processor (AP) controlling a higher layer such as application programs. According to the embodiment of the present disclosure, the controller 740 includes a multi-connection processor 742 that performs the processing to be operated in a multi-connection mode. For example, the controller 740 may control the terminal to perform the operation and procedure of the terminal illustrated in FIGS. 2 to 6.

Figure 8:
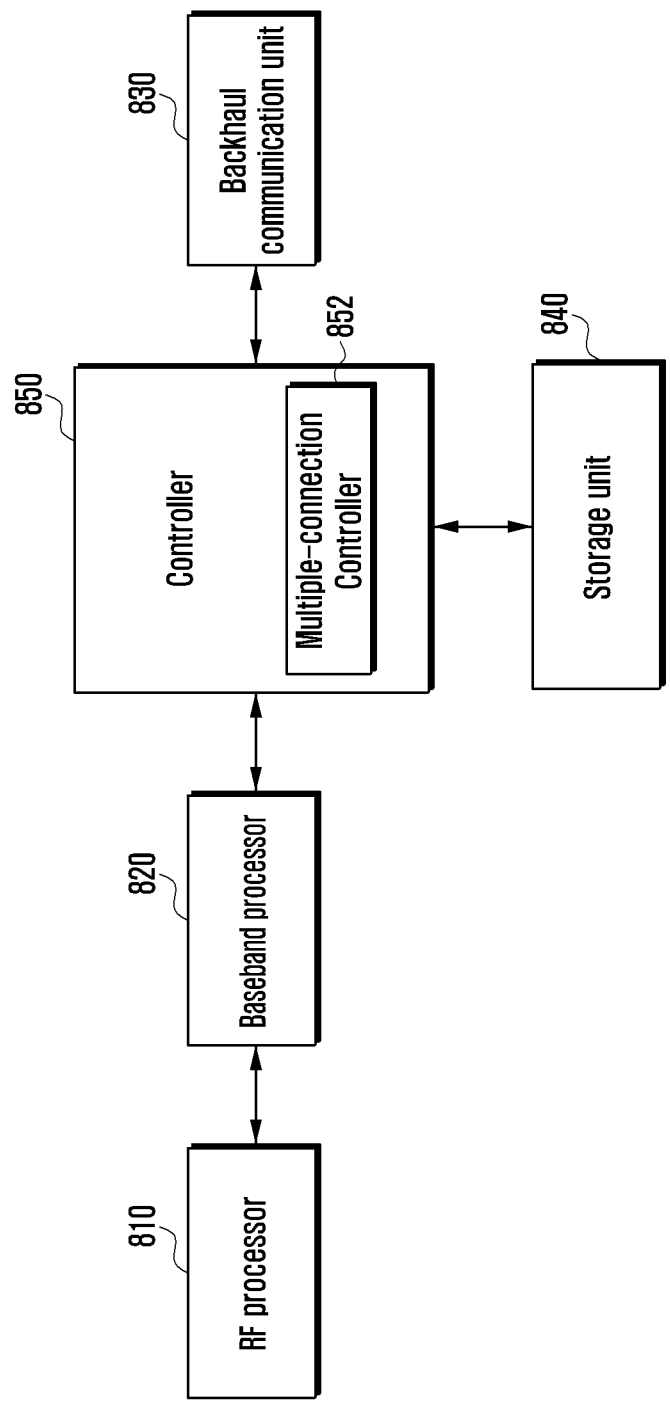
FIG. 8 is a block configuration diagram of a first access node in the wireless communications system according to the embodiment of the present disclosure.

FIG. 8 is a block configuration diagram of the first access node in the wireless communications system according to the embodiment of the present disclosure.

As illustrated in FIG. 8, the first access node is configured to include an RF processor 810, a baseband processor 820, a backhaul communication unit 830, a storage unit 840, and a controller 850.

The RF processor 810 serves to transmit/receive a signal through a radio channel, such as band conversion and amplification of a signal. That is, the RF processor 810 up-converts a baseband signal provided from the baseband processor 820 into an RF band signal and then transmits the baseband signal through an antenna, and down-converts the RF band signal received through the antenna into the baseband signal. For example, the RF processor 810 may include a transmitting filter, a receiving filter, an amplifier, a mixer, an oscillator, a DAC, an ADC, etc. FIG. 8 illustrates only one antenna but the first access node may include a plurality of antennas. Further, the RF processor 810 may include a plurality of RF chains. Further, the RF processor 810 may perform the beamforming. For the beamforming, the RF processor 810 may adjust a phase and a size of each of the signals transmitted/received through a plurality of antennas or antenna elements.

The baseband processor 820 performs a conversion function between the baseband signal and the bit string according to the physical layer standard of the first radio access technology. For example, when data are transmitted, the baseband processor 820 generates complex symbols by coding and modulating a transmitting bit string. Further, when data are received, the baseband processor 820 recovers the receiving bit string by demodulating and decoding the baseband signal provided from the RF processor 810. For example, according to the OFDM scheme, when data are transmitted, the baseband processor 820 generates the complex symbols by coding and modulating the transmitting bit string, maps the complex symbols to the sub-carriers, and then performs the IFFT operation and the CP insertion to configure the OFDM symbols. Further, when data are received, the baseband processor 820 divides the baseband signal provided from the RF processor 810 in the OFDM symbol unit and recovers the signals mapped to the sub-carriers by the FFT operation and then recovers the receiving bit string by the modulation and decoding. The baseband processor 820 and the RF processor 810 transmit/receive a signal as described above. Therefore, the baseband processor 820 and the RF processor 810 may be called a transmitter, a receiver, a transceiver, a communication unit, or a wireless communication unit.

The backhaul communication unit 830 provides an interface for performing communication with other nodes within the network. That is, the backhaul communication unit 830 converts bit strings transmitted from the first access node to other nodes, for example, other access nodes, a core network, etc., into physical signals and converts physical signals received from other nodes into bit strings.

The storage unit 840 stores data such as basic programs, application programs, and configuration information for the operation of the first access node. In particular, the storage unit 840 may store the information on the bearer allocated to the accessed terminal, the measured results reported from the accessed terminal, etc. Further, the storage unit 840 may store information that is a determination criterion on whether to provide a multi-connection to the terminal or stop the multi-connection to the terminal. Further, the storage unit 840 provides the stored data according to the request of the controller 850.

The controller 850 controls the overall operations of the first access node. For example, the controller 850 transmits/receives a signal through the baseband processor 820 and the RF processor 810 or the backhaul communication unit 830. In addition, the controller 850 records data in the storage unit 840 and reads the data. For this purpose, the controller 850 may include at least one processor. According to the embodiment of the present disclosure, the controller 850 includes a multi-connection controller 852 that performs a control to provide the multi-connection to the terminal. For example, the controller 850 may control the first access node to perform the operation and the procedure of the base station illustrated in FIGS. 2, 3, 4, 5, and 6.

Figure 9:
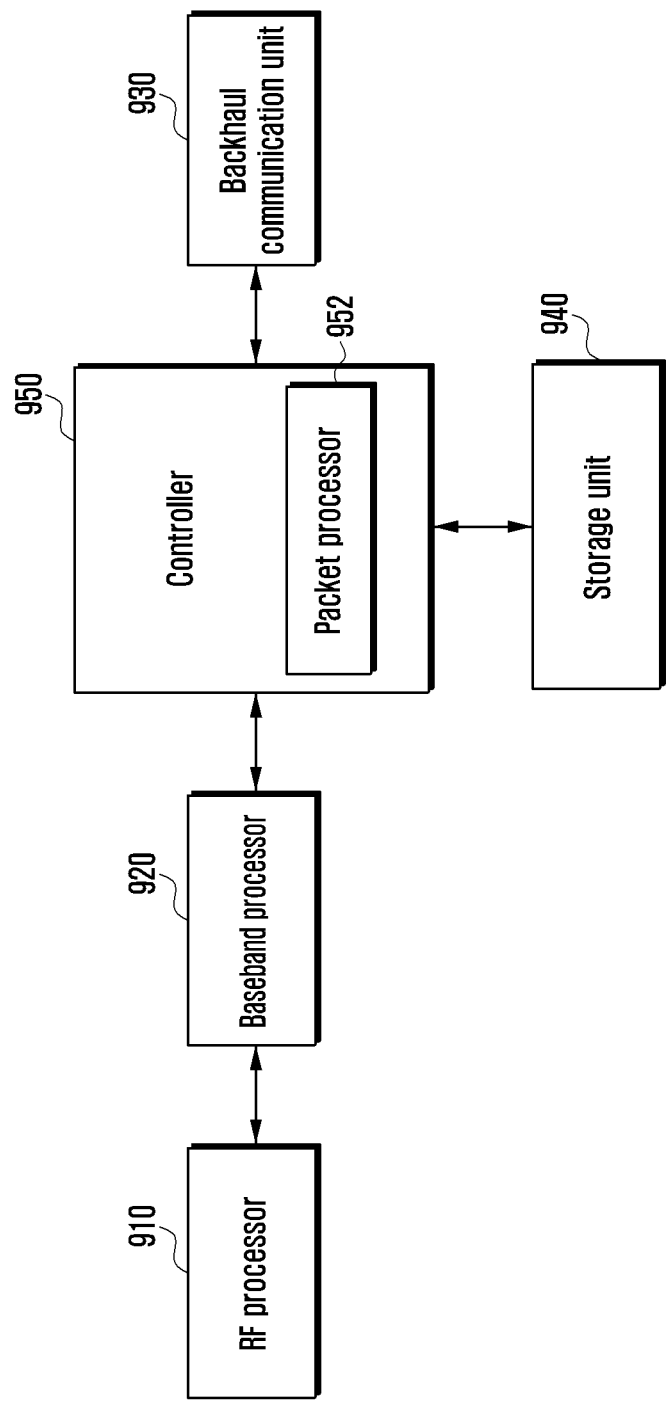
FIG. 9 is a block configuration diagram of a second access node in the wireless communications system according to the embodiment of the present disclosure.

FIG. 9 is a block configuration diagram of the second access node in the wireless communications system according to the embodiment of the present disclosure.

As illustrated in FIG. 9, the second access node is configured to include an RF processor 910, a baseband processor 920, a backhaul communication unit 930, a storage unit 940, and a controller 950.

The RF processor 910 serves to transmit/receive a signal through a radio channel, such as band conversion and amplification of a signal. That is, the RF processor 910 up-converts a baseband signal provided from the baseband processor 920 into an RF band signal and then transmits the baseband signal through an antenna, and down-converts the RF band signal received through the antenna into the baseband signal. For example, the RF processor 910 may include a transmitting filter, a receiving filter, an amplifier, a mixer, an oscillator, a DAC, an ADC, etc. FIG. 9 illustrates only one antenna but the second access node may include a plurality of antennas. Further, the RF processor 910 may include a plurality of RF chains. Further, the RF processor 910 may perform the beamforming. For the beamforming, the RF processor 910 may adjust a phase and a size of each of the signals transmitted/received through a plurality of antennas or antenna elements.

The baseband processor 920 performs a conversion function between the baseband signal and the bit string according to the physical layer standard of the second radio access technology. For example, when data are transmitted, the baseband processor 920 generates complex symbols by coding and modulating a transmitting bit string. Further, when data are received, the baseband processor 920 recovers the receiving bit string by demodulating and decoding the baseband signal provided from the RF processor 910. For example, according to the OFDM scheme, when data are transmitted, the baseband processor 920 generates the complex symbols by coding and modulating the transmitting bit string, maps the complex symbols to the sub-carriers, and then performs the IFFT operation and the CP insertion to configure the OFDM symbols. Further, when data are received, the baseband processor 920 divides the baseband signal provided from the RF processor 910 in the OFDM symbol unit and recovers the signals mapped to the sub-carriers by the FFT operation and then recovers the receiving bit string by the modulation and decoding. The baseband processor 920 and the RF processor 910 transmit/receive a signal as described above. Therefore, the baseband processor 920 and the RF processor 910 may be called a transmitter, a receiver, a transceiver, a communication unit, or a wireless communication unit.

The backhaul communication unit 930 provides an interface for performing communication with other nodes within the network. That is, the backhaul communication unit 930 converts bit strings transmitted from the second access node to other nodes, for example, other access nodes, a core network, etc., into physical signals and converts physical signals received from other nodes into bit strings.

The storage unit 940 stores data such as basic programs, application programs, and configuration information for the operation of the second access node. In particular, the storage unit 940 may store the information on the bearer allocated to the accessed terminal, the measured results reported from the accessed terminal, etc. Further, the storage unit 940 may store information that is a determination criterion on whether to provide a multi-connection to the terminal or stop the multi-connection to the terminal. Further, the storage unit 940 provides the stored data according to the request of the controller 950.

The controller 950 controls the overall operations of the second access node. For example, the controller 950 transmits/receives a signal through the baseband processor 920 and the RF processor 910 or the backhaul communication unit 930. In addition, the controller 950 records data in the storage unit 940 and reads the data. For this purpose, the controller 950 may include at least one processor. According to the embodiment of the present disclosure, the controller 950 includes a packet processor 952 that performs data transmitted/received to the terminal operated in a multi-connection mode. The packet processor 952 may generate and analyze a packet of a second radio access technology including a packet of the first radio access technology as a payload. For example, the controller 950 may control the second access node to be operated as the AP shown in FIGS. 2 to 6.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the present disclosure through an external port. Further, a separate storage device on the communication network may also access a device performing the embodiment of the present disclosure.

<Second Embodiment>

A second embodiment of the present disclosure relates to a method and an apparatus for performing a scheduling request (SR) in a plurality of cells having PUCCH in an LTE mobile communication system.

Figure 10:
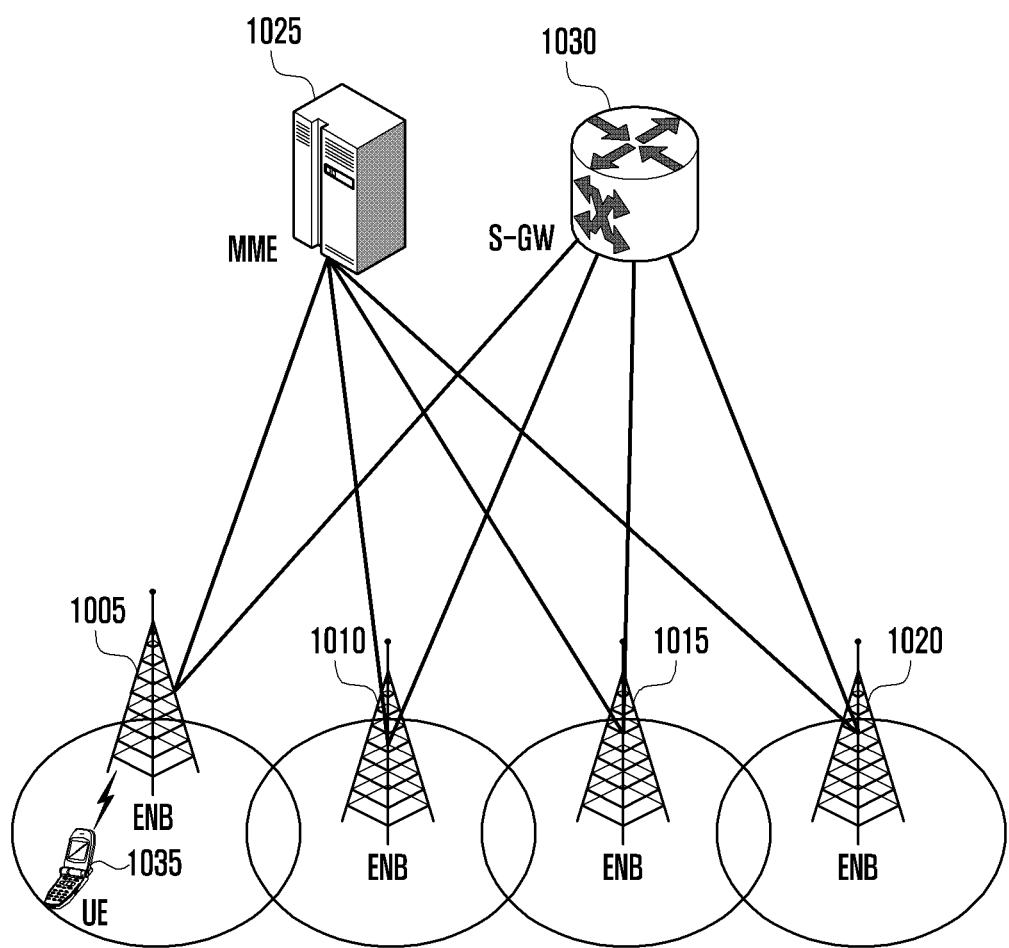
FIG. 10 is a diagram illustrating a structure of the LTE system to which the present disclosure is applied.

FIG. 10 is a diagram illustrating a structure of the LTE system to which the present disclosure is applied.

Referring to FIG. 10, a radio access network of the LTE system is configured to include next-generation base stations (evolved node B, hereinafter, ENB, Node B, or base station) 1005, 1010, 1015, and 1020, a mobility management entity (MME) 1025, and a serving-gateway (S-GW) 1030. User equipment (hereinafter, UE or terminal) 1035 is connected to an external network through the ENBs 1005 to 1020 and the S-GW 1030.

In FIG. 10, the ENBs 1005 to 1020 correspond to the existing node B of a UMTS system. The ENB is connected to the terminal 1035 through a radio channel and performs more complicated role than the existing node B. In the LTE system, in addition to a real-time service like a voice over Internet protocol (VoIP) through the Internet protocol, all the user traffics are served through a shared channel and therefore an apparatus for collecting and scheduling status information such as a buffer status, an available transmission power status, and a channel status of the UEs is required. Here, the ENBs 1005 to 1020 take charge of the collecting and scheduling. One ENB generally controls a plurality of cells. For example, to implement a transmission rate of 100 Mbps, the LTE system uses, as a radio access technology, orthogonal frequency division multiplexing (hereinafter, OFDM) in, for example, a bandwidth of 20 MHz.

Further, an adaptive modulation & coding (hereinafter, referred to as AMC) determining a modulation scheme and a channel coding rate according to a channel status of the terminal is applied. The S-GW 130 is an apparatus for providing a data bearer and generates or removes the data bearer according to the control of the MME 1025. The MME is an apparatus for performing a mobility management function for the terminal and various control functions and is connected to a plurality of base stations.

Figure 11:
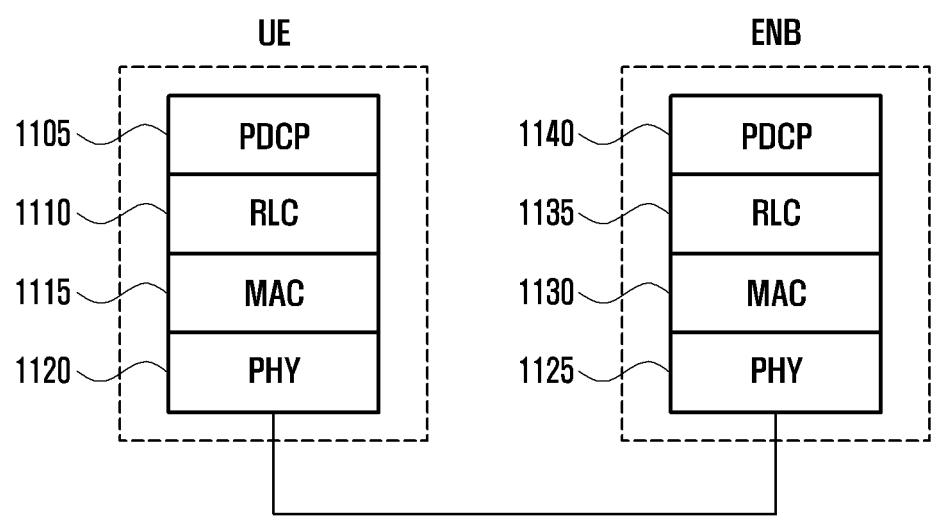
FIG. 11 is a diagram illustrating a radio protocol structure in the LTE system to which the present disclosure is applied.

FIG. 11 is a diagram illustrating a radio protocol structure in the LTE system to which the present disclosure is applied.

Referring to FIG. 11, the radio protocol of the LTE system consists of packet data convergence protocols (PDCPs) 1105 and 1140, radio link controls (RLCs) 1110 and 1135, and medium access controls (MMCs) 1115 and 1130 in the terminal and the ENB, respectively. The packet data convergence protocols (PDCPs) 1105 and 1140 performs operations such as compression/recovery of an IP header and the radio link controls (hereinafter, referred to as RLC) 1110 and 1135 reconfigures a PDCP packet data unit (PDU) to an appropriate size to perform an ARQ operation, or the like. The MACs 1115 and 1130 are connected to several RLC layer apparatuses configured in one terminal and perform an operation of multiplexing RLC PDUs into an MAC PDU and demultiplexing the multiplexed RLC PDUs from the MAC PDU. Physical layers 1120 and 1125 perform an operation of channel-coding and modulating higher layer data, making the channel-coded and modulated higher layer data as an OFDM symbol, transmitting the OFDM symbol to the radio channel, demodulating the OFDM symbol received through the radio channel, channel-decoding the demodulated OFDM symbol, and transmitting the channel-decoded OFDM symbol to a higher layer.

Figure 12:
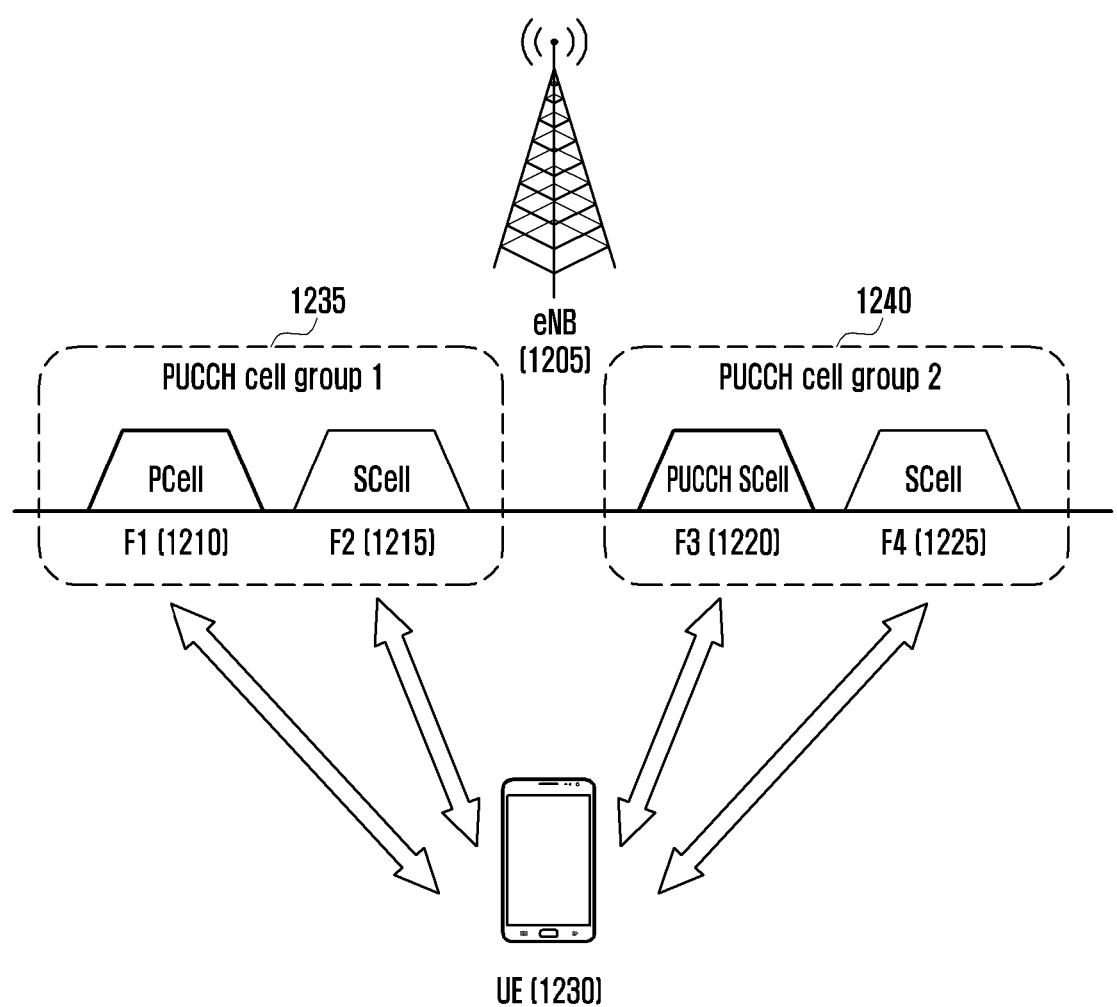
FIG. 12 is a diagram for describing carrier aggregation in the terminal.

FIG. 12 is a diagram for describing improved carrier aggregation in the terminal.

Referring to FIG. 12, one base station generally transmits/receives multi-carriers over several frequency bands. For example, when the base station 1205 transmits uplink carriers for four cells, according to the related art, one terminal uses one of the plurality of cells to transmit/receive data. However, the terminal having carrier aggregation ability may simultaneously transmit/receive data from several carriers. The base station 1205 may allocate more carriers to the terminal 1230 having the carrier aggregation ability in some case to increase a transmission rate of the terminal 1230.

As the traditional meaning, when one forward carrier transmitted from one base station and one reverse carrier received by the base station configure one cell, the carrier aggregation may also be understood that the terminal simultaneously transmits/receives data through several cells. By doing so, the maximum transmission rate is increased in response to the aggregated number of carriers. The LTE Rel-10 carrier aggregation technology may configure up to five cells in one terminal.

One of the configured cells necessarily has the PUCCH, the cell is called a primary cell (PCell), and the rest cells which do not have the PUCCH are called a secondary cell (SCell). The PCell needs to be able to perform functions of a traditional serving cell such as a handover and an RLF, in addition to features having the PUCCH.

Hereinafter, in describing the present disclosure, receiving, by the terminal, data through any forward carrier or transmitting, from the terminal, the data through any reverse carrier have the same meaning as transmitting/receiving the data through a control channel and a data channel which are provided from a cell corresponding to a central frequency and a frequency band characterizing the carriers.

Further, the following embodiment of the present disclosure will describe the LTE system for convenience of explanation but the present disclosure may be applied to various kinds of wireless communication systems supporting the carrier aggregation.

In the Rel-10 carrier aggregation technology, only the PCell may have the PUCCH. However, if an information amount to be transmitted to the base station through the PUCCH is increased, processing, by only the single PUCCH, the corresponding information amount may be burdened. In particular, plan supporting up to 32 carriers in the LTE Rel-13 has been discussed, and therefore the information amount to be transmitted to the base station through the PUCCH may be more increased.

The present disclosure proposes a method for allowing even a specific SCell in addition to the PCell to have PUCCH to thereby disperse PUCCH loading. Therefore, a method for allow even an SCell in addition to a PCell to introduce PUCCH has been proposed.

For example, in FIG. 12, the PUCCH may be additionally introduced into one SCell 1220. In the present disclosure, the SCell having the PUCCH is called a PUCCH SCell. All PUCCH related signaling is transmitted to the base station through the PCell. However, the plurality of PUCCHs are present, and therefore there is a need to identify through which PUCCH the PUCCH signalings of each SCell are transmitted to the base station.

As illustrated in FIG. 12, if it is assumed that two PUCCHs are present, they are divided into a group 1235 of cells using the PUCCH on the PCell and a group 1240 of cells using the PUCCH on a specific SCell. In the present disclosure, the group is called a PUCCH cell group. That is, the PUCCH cell group proposed in the present disclosure may be identified depending on whether to use the PUCCH on the PCell or whether to use the PUCCH on the specific SCell.

A first PUCCH cell group (PUCCH cell group 1) may include a PCell corresponding to a first frequency band 310 and an SCell corresponding to a second frequency band 315, and a second PUCCH cell group (PUCCH cell group 2) may include a PUCCH SCell corresponding to a third frequency band 320 and an SCell corresponding to a fourth frequency band 325.

The terminal 330 may support intra-eNB carrier aggregation, and may use the PCell of the first PUCCH cell group (PUCCH cell group 1) and the PUCCH SCell of the second PUCCH cell group (PUCCH cell group 2) to transmit the corresponding information to the base station 305.

That is, in the LTE mobile communication system, the terminal 330 may report HARQ feedback information, channel status information (CSI) report, scheduling request (SR) or the like to the base station 305 through the PCell of the first PUCCH cell group (PUCCH cell group 1) and the PUCCH SCell of the second PUCCH cell group (PUCCH cell group 2).

Figure 13:
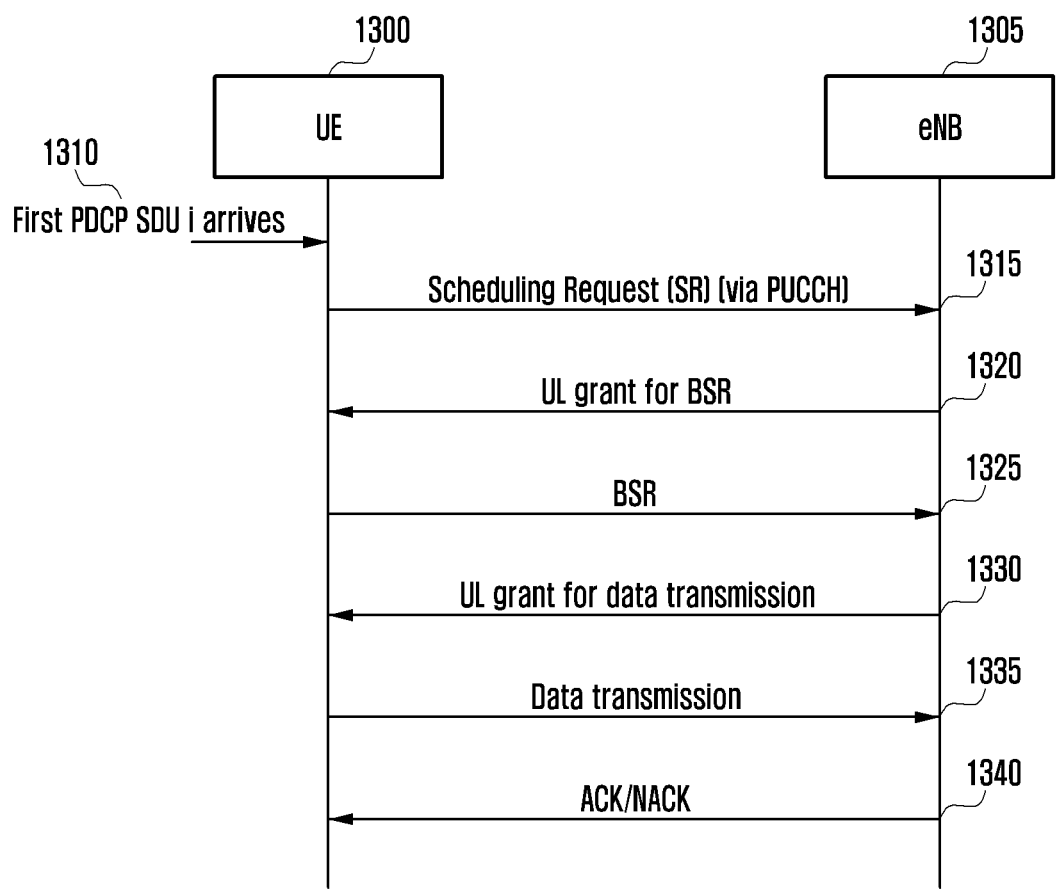
FIG. 13 is a diagram for describing a process of receiving a radio resource allocated from the base station by allowing the terminal to transmit the SR.

FIG. 13 is a diagram for describing a process of receiving a radio resource allocated from the base station by allowing the terminal to transmit the SR.

In step 1310, a terminal 1300 generates a PDCP SDU to be transmitted. In step 1315, the terminal 1300 determines whether the radio resource transmitting the data is present. If the resource is not present, it is determined whether the available PUCCH is allocated. The PUCCH may be the PUCCH on the PCell or the PUCCH on the PUCCH SCell.

If the PUCCH is present, the terminal 1300 transmits the SR to a base station 1305 using the PUCCH. In this case, an sr-ProhibitTimer timer starts. In step 1320, the base station successfully receiving it schedules a radio resource which may transmit a buffer status report (BSR) to the terminal. If the radio resource which may transmit the BSR is not scheduled and the sr-ProhibitTimer timer expires, the SR may be transmitted again. Further, an SR_COUNTER counter value is increased by 1 every time the SR transmission is tried. If one set value of the counter value is equal to dsr-TransMax, the terminal tries the random access to the base station. The base station sets the dsr-TransMax value in the terminal, in which the dsr-TransMax value is one of {4, 8, 16, 32, 64}. The BSR is used to inform the base station how much the terminal has a transmission data.

In step 1325, the terminal uses the allocated radio resource to transmit the BSR. In step 1330, the base station allocates the radio resource which may transmit the PDCP SDU. In step 1335, the terminal transmits the data to the base station. In step 1340, the base station transmits ACK/NACK information on the data.

The terminal periodically uses the allocated SR radio resource to transmit the SR to the base station. As shown in the following Table 1, the SR radio resource is allocated to the PUCCH at a period of at least 1 ms and up to 80 ms.

TABLE 1

Table 1. SR period and subframe offset setting information

| SR configuration Index ISR | SR periodicity (ms) SRPERIODICITY | SR subframe offset NOFFSET, SR |
|---|---|---|
| 0-4 | 5 | ISR |
| 5-14 | 10 | ISR − 5 |
| 15-34 | 20 | ISR − 15 |
| 35-74 | 40 | ISR − 35 |
| 75-154 | 80 | ISR − 75 |
| 155-156 | 2 | ISR − 155 |
| 157 | 1 | ISR − 157 |

The SR period is associated with the delay time. If the SR period is set short, the terminal may transmit its own SR to the base station rapidly as much. However, as the SR period is set shorter, the occupancy rate of resources to be allocated to the SR within the PUCCH radio resource is increased.

Table 2 shows the occupancy rate of PUCCH radio resources according to the SR period. When the SR period is 10 ms or more, the occupancy rate is low irrespective of the number of terminals. However, if the SR period is set short as 1 to 5 ms, the occupancy rate will be significantly increased. This means that the amount of radio resources available for the HARQ feedback information and the CSI information in addition to the SR is reduced. Therefore, if it is desired to lower the occupancy rate while minimizing the delay time, it is desirable to be able to transmit the SR even in the PUCCH on the SCell.

TABLE 2

Table 2 Occupancy rate of PUCCH radio resource according to SR period

| | | Number of UEs with the SR configured | | | | |
|---|---|---|---|---|---|---|
| | | 18 | 36 | 72 | 144 | 288 |
| SR periodicity | 1 | 2.00% | 4.00% | 8.00% | 16.00% | 32.00% |
| | 2 | 1.00% | 2.00% | 4.00% | 8.00% | 16.00% |
| | 5 | 0.40% | 0.80% | 1.60% | 3.20% | 6.40% |
| | 10 | 0.20% | 0.40% | 0.80% | 1.60% | 3.20% |
| | 20 | 0.10% | 0.20% | 0.40% | 0.80% | 1.60% |
| | 40 | 0.05% | 0.10% | 0.20% | 0.40% | 0.80% |
| | 80 | 0.03% | 0.05% | 0.10% | 0.20% | 0.40% |

In the LTE mobile communication system, if a scheduling request (SR) may be transmitted from a plurality of cells having a PUCCH, a method of effectively transmitting an SR is proposed. The present disclosure proposes two embodiments.

In a 2-1-th embodiment, the PUCCH on the SCell is preferentially used to transmit the SR, and the PUCCH on the PCell is used for the purpose of fallback. If the transmission of the SR to the base station fails even when the SR is retransmitted by a predetermined frequency in the PUCCH on the SCell, the PUCCH on the PCell is used to transmit the SR.

According to a 2-2 embodiment, the SR of the terminal is transmitted to the PUCCH which can first transmit the SR among the PUCCHs on the PCell and the SCell. If a newly triggered SR or sr-ProhibitTimer expires and thus the previously triggered SR is transmitted, the PUCCH which can first transmit the SR is selected and performs the transmission of the SR. At this time, individual SR_COUNTER values are applied to the PUCCHs on each PCell and SCell.

<2-1-th Embodiment>

In a 2-1-th embodiment, the PUCCH on the SCell is preferentially used to transmit the SR, and the PUCCH on the PCell is used for the purpose of fallback. That is, if the terminal triggers one SR according to the existing rules, the terminal preferentially uses the SR radio resource of the SCell to transmit its own SR. If the SR transmission finally fails, the SR transmission is tried again using the SR radio resource of PCell.

If the SR period is set to be somewhat longer in the PUCCH on the PCell but the SR period is set shorter in the PUCCH on the SCell, when the terminal can transmit the SR quickly and at the same time the SR transmission is not successfully performed in the PUCCH on the SCell, this is advantageous in that the SR transmission opportunity may be given again in the PUCCH on the PCell. This guarantees the fast SR transmission, but may lower the occupancy rate of the SR radio resource in the radio resource of the PUCCH on the PCell.

Figure 14:
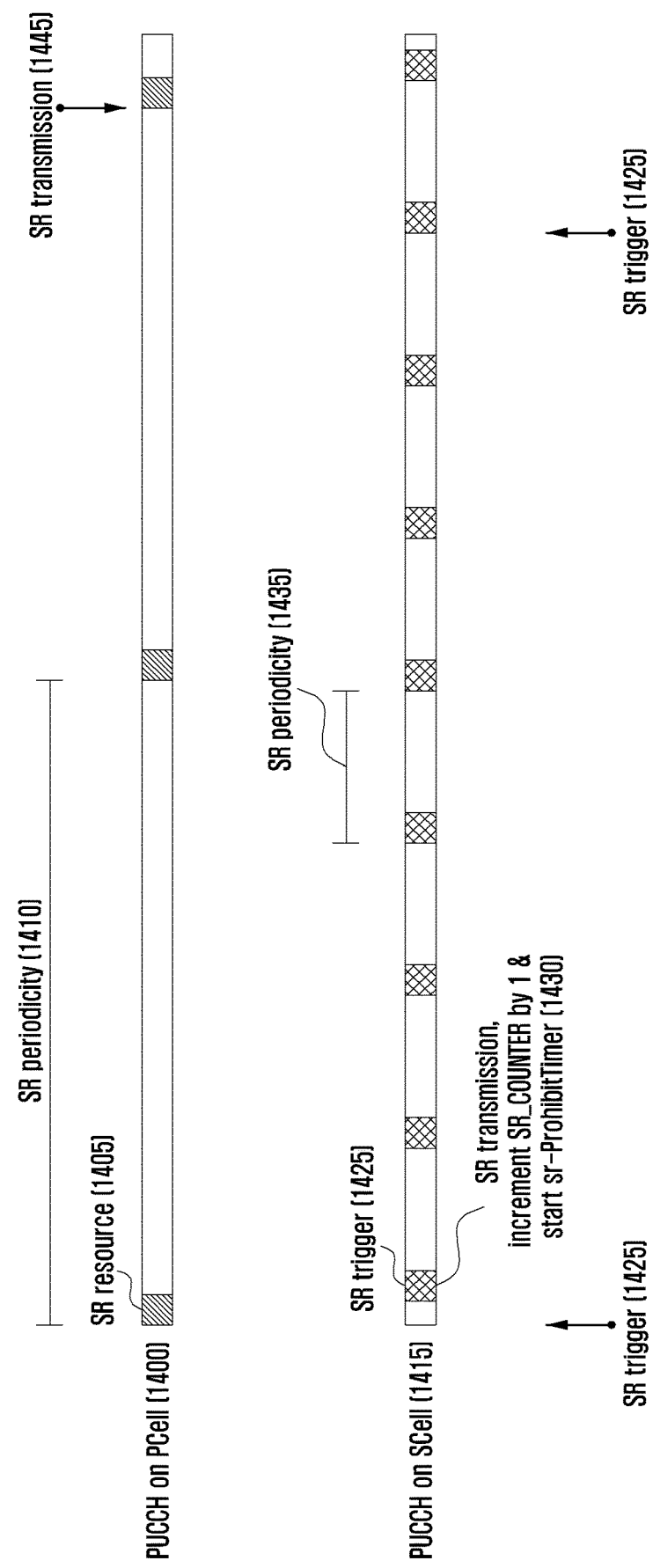
FIG. 14 is a diagram for conceptually describing a 2-1-th embodiment of the present disclosure.

FIG. 14 is a diagram for conceptually describing a 2-1-th embodiment of the present disclosure. Assume that two serving cells, that is, a PCell 1400 and one SCell 1415 provide the PUCCH. An SR period 1405 of an SR radio resource 505 in the PUCCH on the PCell need not to be the same as an SR period 1435 of an SR radio resource 1420 in the PUCCH on the SCell. Further, offset values of positions of the SR radio resources need not be the same.

If one SR is triggered (1425), the terminal preferentially uses the PUCCH on the SCell rather than using the PUCCH on the PCell to try the SR transmission. The SR_COUNTER value is increased by 1 every time the SR is transmitted. (1430).

After the SR is transmitted, the sr-ProbihitTimer starts. If the sr-ProhibitTimer has expired and the radio resource has not yet been scheduled in response to the SR transmission, the terminal transmits the SR using the PUCCH on the SCell again. However, if the SR_COUNTER which has been increased by 1 coincides with dsr-TransMax, the repeated SR transmission is not made any more. At this time, the conventional technique tries the random access to the cell.

However, in the present disclosure, even if the SR_COUNTER value reaches dsr-TranMax (1440), the random access is not tried to the SCell. Instead, the SR is again transmitted to the PUCCH on PCell (1445). At this time, the transmission of the SR to the PUCCH on the PCell may be allowed only once, or the SR_COUNTER value may be reset and thus the retransmission thereof may be permitted until the SR_COUNTER value again reaches the dsr-Trans-Max.

Even if the SR_COUNTER value reaches the dsr-Trans-Max by the retransmission of the SR in the PUCCH on the PCell, if not receiving the scheduling, the terminal tries the random access to the PCell.

Figure 15:
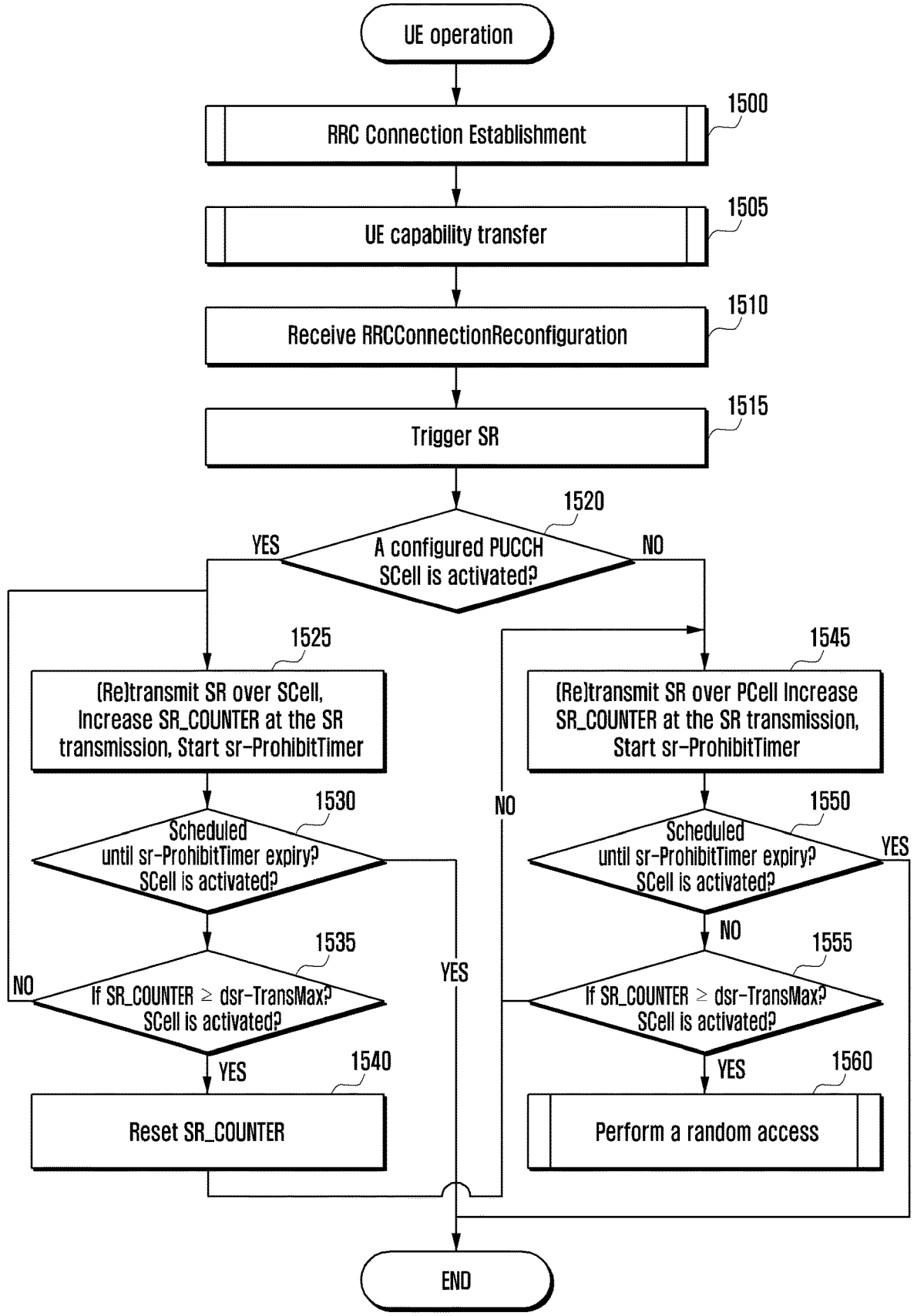
FIG. 15 is a diagram for describing the operation of the terminal according to the 2-1-th embodiment of the present disclosure.

FIG. 15 is a diagram for describing the operation of the terminal according to the 2-1-th embodiment of the present disclosure.

In step 1500, the terminal performs RRC Connection Establishment and switches to a connection mode. In step 1505, the terminal informs the base station whether the terminal supports the PUCCH on the SCell by the UE capability transfer process.

In step 1510, the terminal receives an RRC Connection Reconfiguration message from the base station. The RRC message includes the SR configuration information such as an sr-ProhibitTimer value and a dsr-TransMax value. In addition, it includes the configuration information for the SCell having the PUCCH.

In step 1515, one SR is triggered. In step 1520, the terminal determines whether the SCell having the configured PUCCH is in an activated state. If the PUCCH on the SCell is available, the terminal transmits its own SR using the SR radio resource allocated to the PUCCH on the SCell in step 625. Also, the SR_COUNTER value is increased by 1 and the sr-ProhibitTimer timer is driven. If the PUCCH on SCell is not available, the SR is transmitted in the PUCCH on PCell according to the existing technique (1545).

It is determined in step 1530 whether or not the radio resource capable of transmitting its own BSR is scheduled before the sr-ProhibitTimer has expired. If scheduled, the SR transmission operation is terminated. Otherwise, it is determined in step 1535 whether the SR_COUNTER value has reached the dsr-TransMax value. If not, the terminal returns to step 1525 to retransmit the SR.

If the SR_COUNTER value is equal to the dsr-TransMax value, the terminal performs an operation of resetting the SR_COUNTER value in step 1540 and transmitting the SR in the PUCCH on the PCell in step 1545.

In step 1545, the terminal transmits its own SR using the SR radio resource allocated to the PUCCH on the PCell. Also, the SR_COUNTER value is increased by 1 and the sr-ProhibitTimer timer is driven.

It is determined in step 1550 whether or not the radio resource capable of transmitting its own BSR is scheduled before the sr-ProhibitTimer has expired. If scheduled, the SR transmission operation is terminated. Otherwise, it is determined in step 1555 whether the SR_COUNTER value has reached the dsr-TransMax value. If not, the terminal returns to step 1545 to retransmit the SR. If the SR_COUNTER value is equal to the dsr-TransMax value, the terminal performs the random access.

<2-2-th Embodiment>

According to a 2-2-th embodiment, the SR of the terminal is transmitted to the PUCCH which can first transmit the SR among the PUCCHs on the PCell and the SCell. If a newly triggered SR or sr-ProhibitTimer expires and thus the previously triggered SR is transmitted, the PUCCH which can first transmit the SR is selected and performs the transmission of the SR. At this time, individual SR_COUNTER values are applied to the PUCCHs on each PCell and SCell.

That is, according to the 2-2-th embodiment, if the SR is triggered, the SR is transmitted to a side which can first transmit the SR among the SR radio resources of the PCell and the SCell.

In the 2-2-th embodiment, the load by the SR may be equally distributed to the PCell and the SCell and the terminal may transmit the SR as fast as possible. Individual SR_COUNTER is applied to the PUCCHs on the PCell and the SCell. That is, the SR_COUNTER is increased by 1 when the SR is transmitted to the PUCCH on the PCell and the SR_COUNTER SCell is increased by 1 when the SR is transmitted to the PUCCH on the SCell. The dsr-TransMax value may apply the same value or different values to the two PUCCHs.

Figure 16:
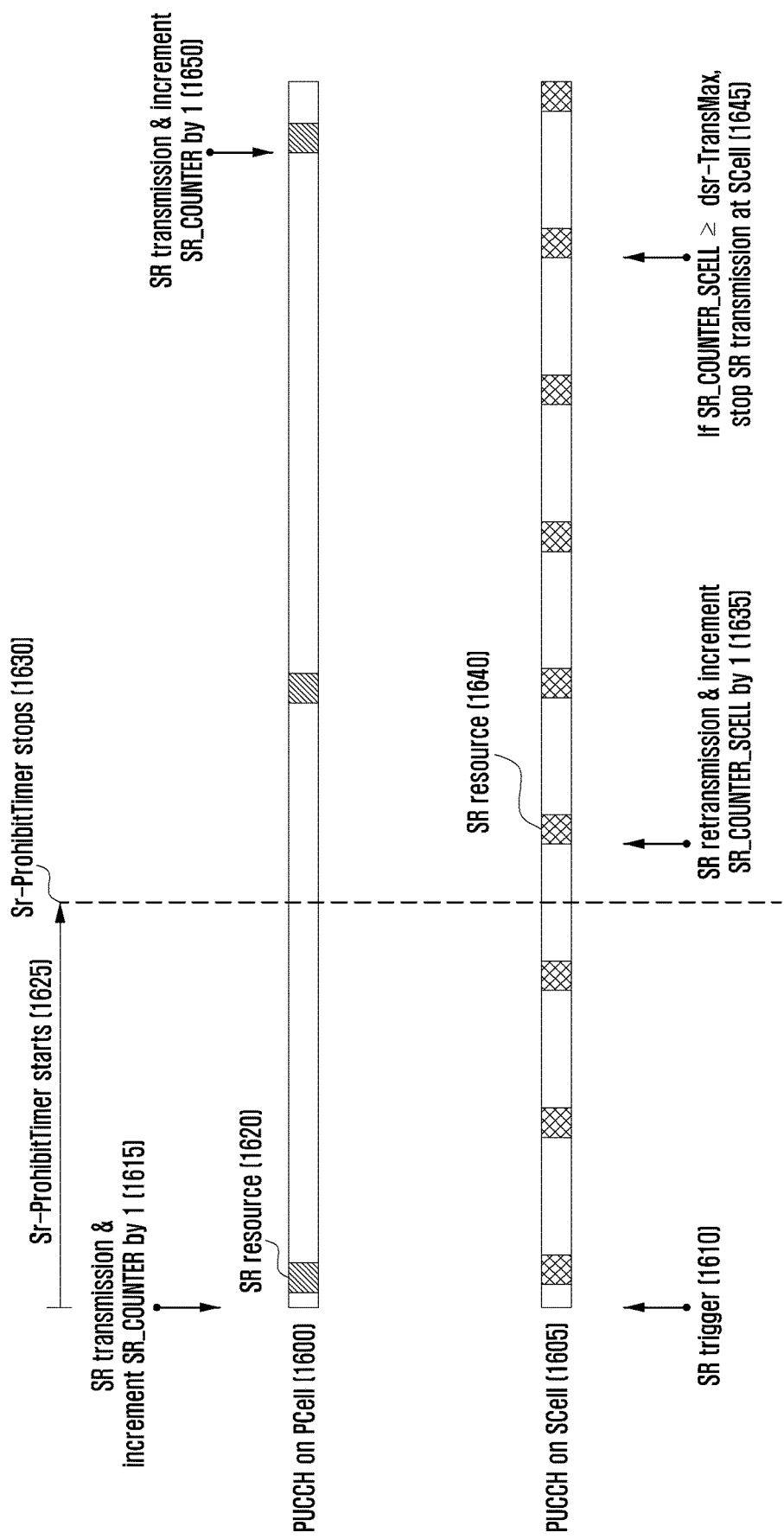
FIG. 16 is a diagram for conceptually describing a 2-2-th embodiment of the present disclosure.

FIG. 16 is a diagram for conceptually describing a 2-2-th embodiment of the present disclosure. If one SR is triggered (1610), it is determined which of SR radio resources allocated to a PUCCH on a PCell 1600 or an SCell 1605 is first transmitted.

The SR may be first transmitted using the SR radio resource 1620 of the PUCCH on the PCell. At this time, the terminal increments the SR_COUNTER value by 1 together with the transmission of the SR (1615). Also, sr-Prohibit-Timer starts (1625). If the scheduling is not received until the sr-ProhibitTimer expires (1630), the SR transmission is tried again after the timer expires. At this time, the SR may first be transmitted first using a PUCCH 1640 of the SCell. At this time, the SR_COUNTER SCell is increased by 1 together with the SR transmission (1635).

Also, sr-ProhibitTimer starts. If the SR_COUNTER SCell becomes equal to a dsr-TransMax value, the SR is not transmitted through the PUCCH on the SCell (1645). If the SR_COUNTER value is not yet equal to the dsr TransMax value, the SR may still be transmitted using the PUCCH on PCell (1650).

When even the SR_COUNTER value reaches dsr TransMax, the terminal performs a random access. The SR_COUNTER SCell value does not reach dsr-TransMax, and the SR_COUNTER value may first reach the dsr-TransMax value. In this case, the random access to the PCell is immediately performed. An alternative plan stops transmitting the SR using the PUCCH on the PCell and transmits the SR using the PUCCH on the SCell until the SR_COUNTER SCell reaches the dsr-TransMax. If even the SR_COUNTER SCell value reaches dsr-TransMax, the random access to the PCell or the SCell is performed.

Figure 17A:
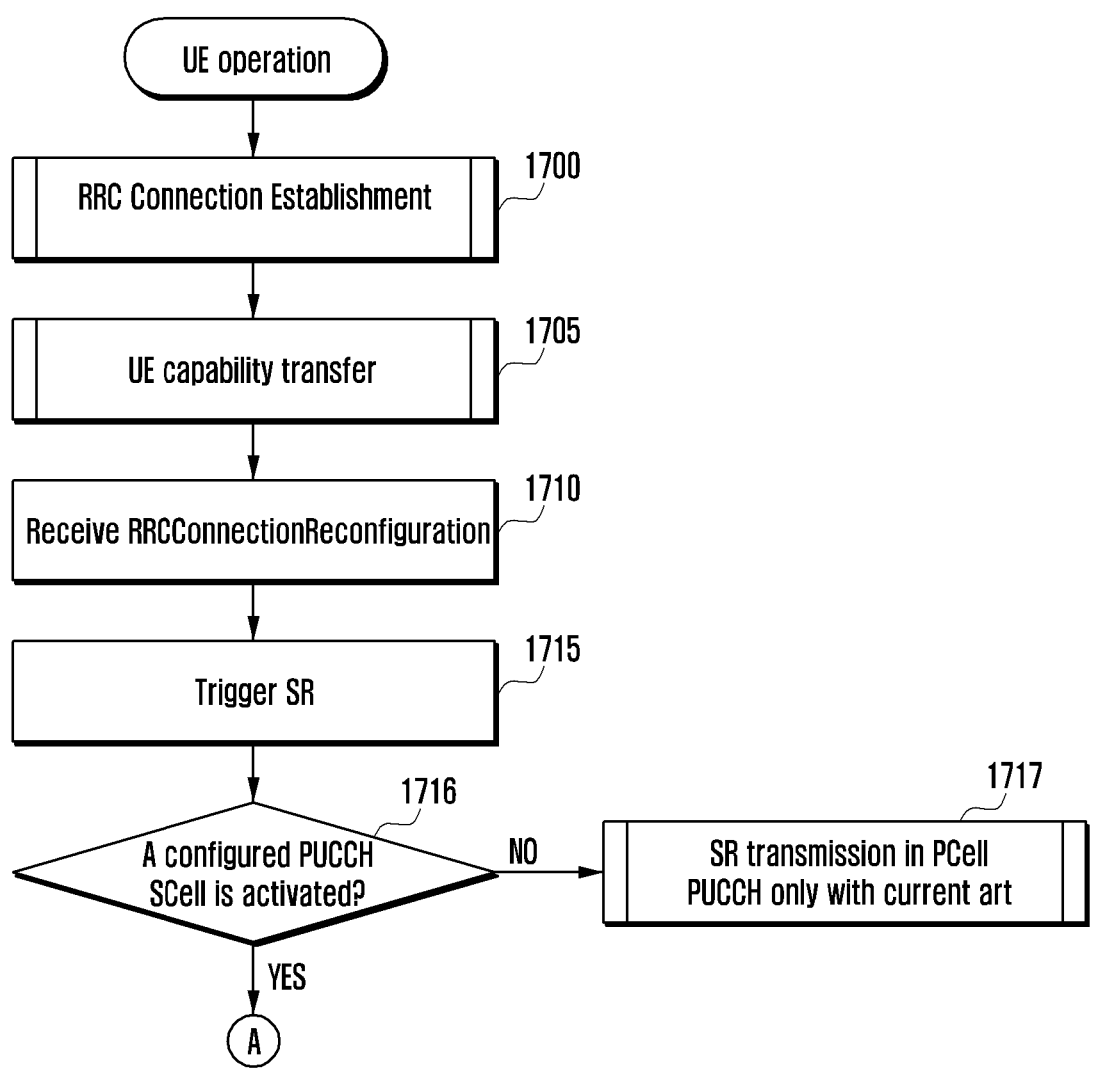
FIGS. 17A and 17B are diagrams for describing the operation of the terminal according to the 2-2-th embodiment of the present disclosure.
Figure 17B:
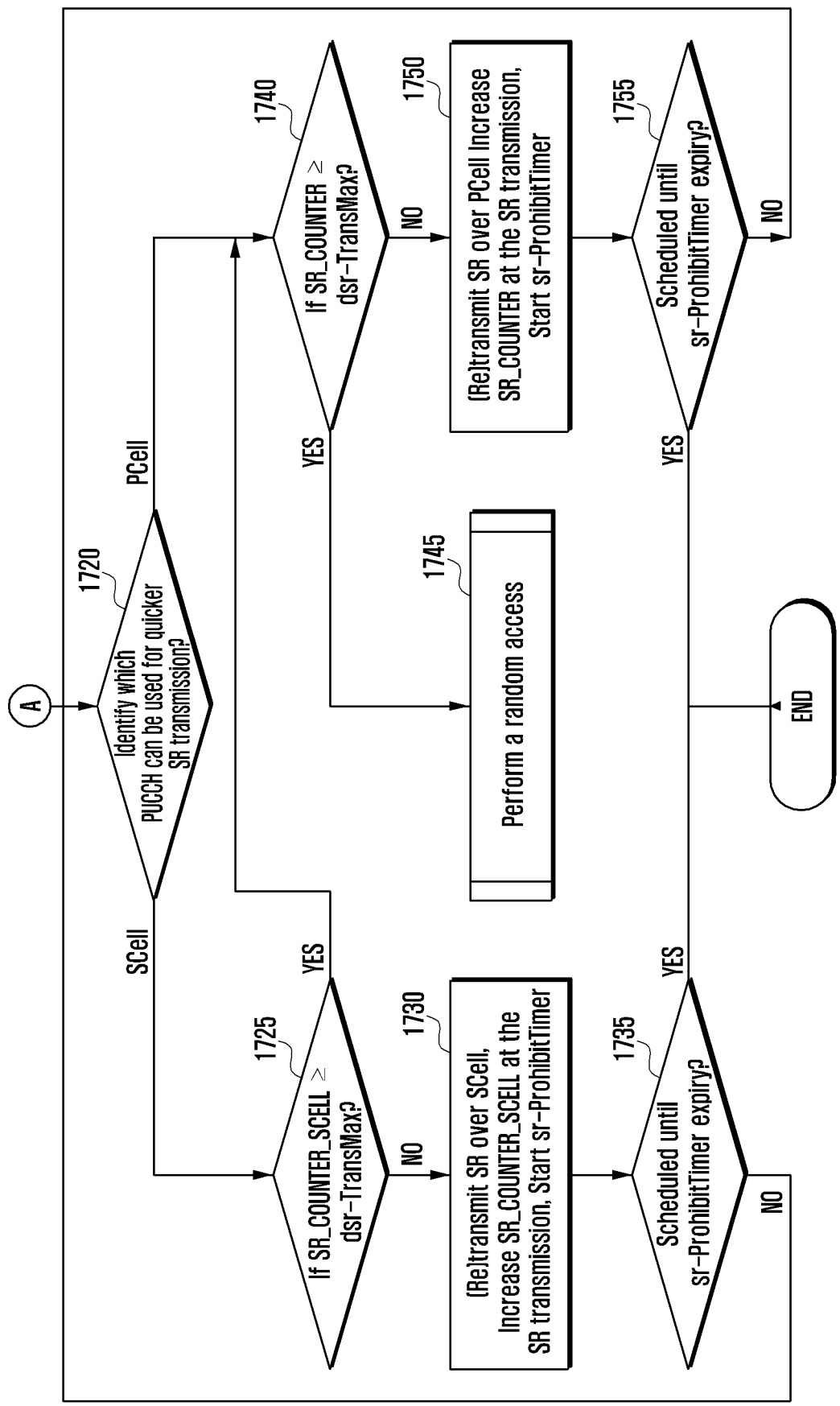

FIGS. 17A and 17B are diagrams for describing the operation of the terminal according to the 2-2-th embodiment of the present disclosure.

Referring to FIG. 17A, in step 1700, the terminal performs the RRC Connection Establishment and switches to a connection mode. In step 1705, the terminal informs the base station whether the terminal supports the PUCCH on the SCell by the UE capability transfer process.

In step 1710, the terminal receives the RRC Connection Reconfiguration message from the base station. The RRC message includes the SR configuration information such as an sr-ProhibitTimer value and a dsr-TransMax value. In addition, it includes the configuration information for the SCell having the PUCCH. The dsr-TransMax value may be set in plural so that different values may be applied to the PCell and the SCell.

That is, as the dsr-TransMax value, there are the dsr-TransMax applied to the PUCCH on the PCell and the dsr-TransMax_Scell applied to the PUCCH on the SCell. In the present drawing, it is described that the same value is applied. In step 1715, one SR is triggered. In step 1716, the terminal determines whether the SCell having the configured PUCCH is in an activated state. If the PUCCH on the SCell is not available, in step 1717, the SR is transmitted using only the PUCCH on the PCell according to the existing technology.

Referring to FIG. 17B, if the PUCCH on the SCell may be available, in step 1720, it is determined in the PUCCH on which of the serving cells the SR may be first transmitted. If it is possible to transmit the SR in the PUCCH on the SCell first, it is determined in step 1725 whether the SR_COUNTER SCell value applied to the PUCCH on the SCell is equal to or greater than the dsr-TransMax value. If it is equal to or does not greater than the dsr-TransMax value, in step 1730, the terminal transmits its own SR using the SR radio resource allocated to the PUCCH on the SCell. Also, the SR_COUNTER value is increased by 1 and the sr-ProhibitTimer timer is driven. If the SR_COUNTER_SCell value is equal to or greater than the value of dsr-TransMax, the process of transmitting the SR in the PUCCH on the SCell is stopped and the switching to the process of transmitting SR only in the PUCCH on the PCell according to the existing technology is performed.

It is determined in step 1735 whether or not the radio resource capable of transmitting its own BSR is scheduled before the sr-ProhibitTimer has expired. If scheduled, the SR transmission operation is terminated. Otherwise, the terminal returns to step 1720 and selects the PUCCH that may transmit the SR first. At this time, if the SR_COUNTER_SCell has already reached the dsr-TranMax, only PCell is unconditionally selected. If the PCell is selected as a cell for transmitting the SR, the operation of transmitting the SR is performed in the PUCCH on the PCell.

In step 1740, it is determined whether the SR_COUNTER value has reached the dsr-TransMax value. If equal, in step 1745, the random access to the PCell is performed. Otherwise, in step 1750, the terminal transmits its own SR using the SR radio resource allocated to the PUCCH on the PCell. Also, the SR_COUNTER value is increased by 1 and the sr-ProhibitTimer timer is driven.

It is determined in step 1755 whether or not the radio resource capable of transmitting its own BSR is scheduled before the sr-ProhibitTimer has expired. If scheduled, the SR transmission operation is terminated. Otherwise, the terminal returns to step 1720 to retransmit the SR.

Figure 18:
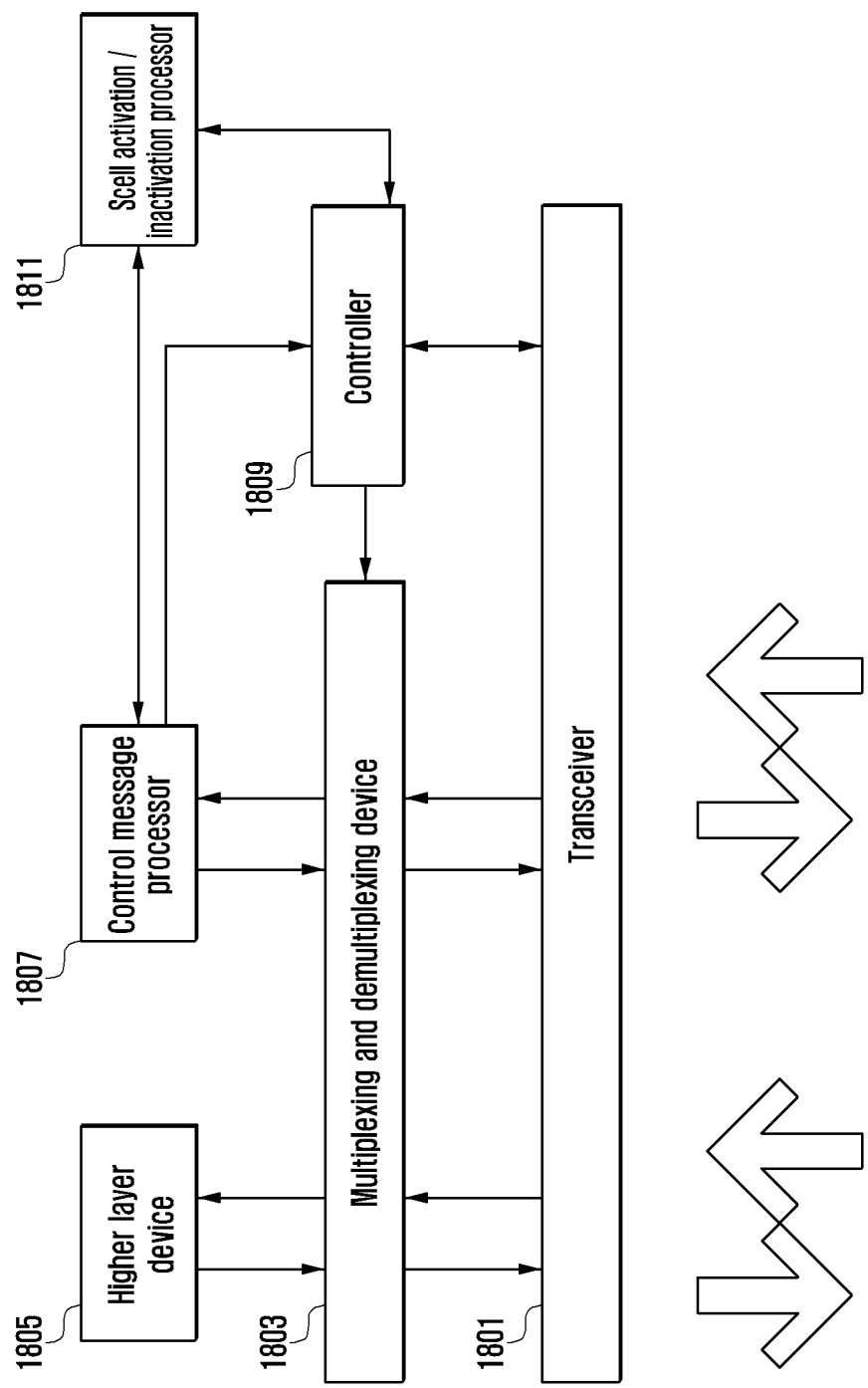
FIG. 18 is a diagram illustrating a terminal apparatus to which the present disclosure is applied.

FIG. 18 illustrates the terminal apparatus to which the present disclosure is applied. The terminal transmits/receives data, etc., to and from a higher layer 1805, transmits/receives control messages through a control message processor 1807, upon the transmission, multiplexes data by a multiplexing and demultiplexing device 1803 according to a control of a controller 1803 and then transmits the data through a transmitter (1801), and upon the reception, receives (1807) a physical signal to a receiver according to the control of the controller 1809 (1801), demultiplexes the received signal by the multiplexing and demultiplexing device 1803, and then transmits the received signal to the higher layer 1805 or the control message processor 1807 according to the message information.

In the present disclosure, if the control message processor 1807 receives the activation/inactivation MAC CE, the control message processor 1811 informs an SCell activation/inactivation processor 1809 of the received activation/inactivation MAC CE to determine first timing upon the activation, and the controller 1809 and the control message processor 1807 are instructed to perform the operations to be performed at the first timing. If the inactivation of the already activated SCell is instructed, second timing is determined, and the controller 1809 and the control message processor 1807 are instructed to perform first operations to be performed before the second timing and are instructed to perform the second operations to be performed at the second timing.

If using the proposed method, the defined operation is performed at the defined timing when the SCell is activated and inactivated in the case of using the carrier aggregation technology, thereby preventing a malfunction and performing an accurate operation.

While the present disclosure has been described in connection with the exemplary embodiments thereof, various modifications and variations can be made without departing from the scope of the present disclosure. Therefore, the scope of the present disclosure should be not construed as being limited to the described exemplary embodiments but be defined by the appended claims as well as equivalents thereto.

<Third Embodiment>

A wireless communication system makes great advances in hardware or software to provide better communication quality. For example, communication technologies using a plurality of antennas, not one antenna have been developed and technologies for more efficiently recovering a physical signal to data have also been developed.

As one of many technologies to meet a demand for gradually increasing large-capacity communication, a scheme for providing multi-connection has been proposed. For example, a carrier aggregation (CA) technique of a long term revolution (LTE) system may provide multi-connections through a plurality of carriers. Therefore, a user may receive a service through more resources.

An embodiment of the present disclosure provides an apparatus and a method for providing a multi-connection in a wireless communication system. Another embodiment of the present disclosure provides an apparatus and a method for providing a multi-connection using different radio access technologies (RATs) in a wireless communication system. Another embodiment of the present disclosure provides an apparatus and a method for selecting an access node for multi-connection in a wireless communication system.

Hereinafter, the present disclosure will describe a technology for providing a multi-connection in a wireless communication system.

Terms identifying an access node, terms indicating network entity, terms indicating messages, terms indicating an interface between network entities, terms indicating various types of identification information, and so on that are used in the following description are exemplified for convenience of explanation. Accordingly, the present disclosure is not limited to terms to be described below and other terms indicating objects having the equivalent technical meaning may be used.

Hereinafter, for convenience of explanation, the present disclosure uses terms and names that are defined in the 3rd Generation Partnership Project Long Term Evolution (3GPP LTE) and the Institute of Electrical and Electronical Engineers (IEEE) 802. 11 standard. However, the present disclosure is not limited to the terms and names but may also be identically applied even to the system according to other standards.

Hereinafter, the present disclosure describes embodiments for using a wireless local area network technology in a cellular communication system to provide a multi-connection. However, other radio access technologies (RATs) in addition to a wireless LAN may be applied.

Figure 19:
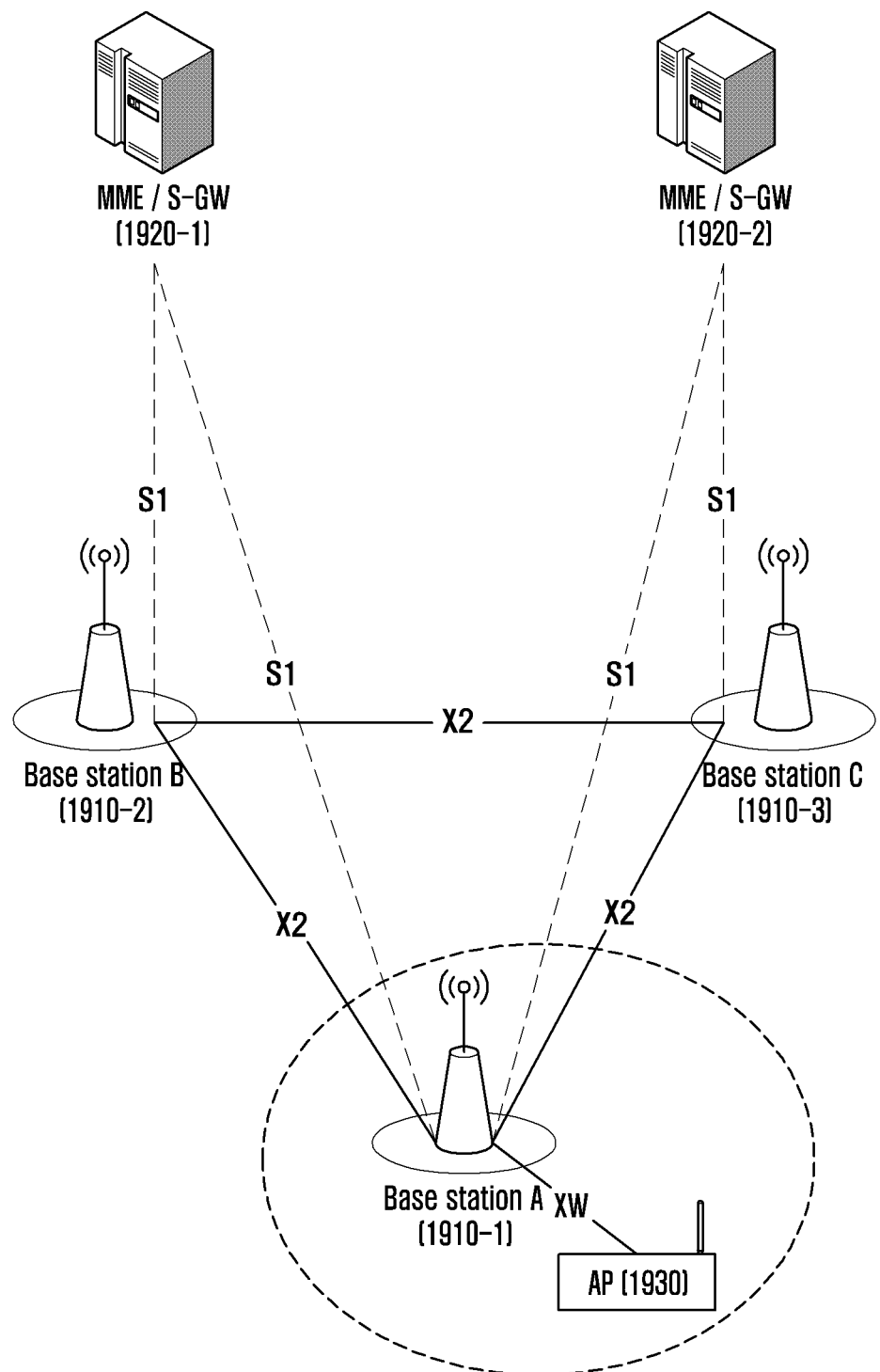
FIG. 19 is a diagram illustrating an example of the network structure of the wireless communication system according to the embodiment of the present disclosure.

FIG. 19 is a diagram illustrating an example of the network structure of the wireless communication system according to the embodiment of the present disclosure.

Referring to FIG. 19, the wireless communication system includes a base station A 1910-1, a base station B 1910-2, a base station C 1910-3, mobility management entity (MME)/serving-gateways (S-GWs) 1920-1 and 1920-2, and an access point (AP) 1930. FIG. 19 illustrates three base stations, in which at least two or four base stations may be present. The MME/S-GWs 1920-1 and 1920-2 may each be separated into the MME and the S-GW.

The base stations 1910-1, 1910-2, and 1910-3 are access nodes of the cellular network and provide a radio access to terminals that are connected to the network. That is, the base stations 1910-1, 1910-2, and 1910-3 support a connection between the terminals and a core network. According to various embodiments of the present disclosure, the base station A 110-1 may use an AP 1930 to provide the multi-connection to the terminal.

The MME/S-GWs 1920-1 and 1920-2 manages mobility of the terminal. Further, the MME/S-GWs 1920-1 and 1920-2 may further perform authentication, bearer management, etc., on the terminals that are connected to the network. The MME/S-GWs 1920-1 and 1920-2 process packets arrived from the base stations 1910-1, 1910-2, and 1910-3 and process packets to be forwarded to the base stations 1910-1, 1910-2, and 1910-3.

The AP 1930 is an access node of the wireless LAN network and provides a radio access to the terminals. In particular, according to various embodiments of the present disclosure, the AP 1930 may provide a wireless LAN based connection for the multi-connection to the terminal by a control of the base station A 1910-1. According to the embodiment of the present disclosure, the AP 1930 may be included in the base station A 1910-1 or may be connected to the base station A 1910-1 through a separate interface. In this case, the base station A 1910-1 may directly transmit some of downlink data to the terminal and transmit the rest of the downlink data to the terminal through the AP 1930. Further, the terminal may transmit some of uplink data to the base station A 1910-1 and transmit the rest of the uplink data to the AP 1930.

The terminal may access the cellular network through the base station A 1910-1. According to the embodiment of the present disclosure, the base station A 1910-1 may additionally set an access to the AP 1930 to the terminal to control the terminal to perform communications in a wider band. In this case, even if core network equipment (for example: MME, S-GW, packet data network gateway (P-GW), etc.) does not recognize that the multi-connection is set by additionally using the AP 1930 in a radio section, a service may be provided.

If the multi-connection is provided by the AP 1930, there is a need to determine to which of the multi-connections data are transmitted. For example, in the case of the downlink, the base station A 1910-1 may receive data from the core network and determine whether to transmit the data to the terminal through the wireless LAN or whether to directly transmit the data to the terminal. Further, in the case of the uplink, the terminal may determine to which path data are transmitted and the terminal may transmit the data to the core network.

Figure 20:
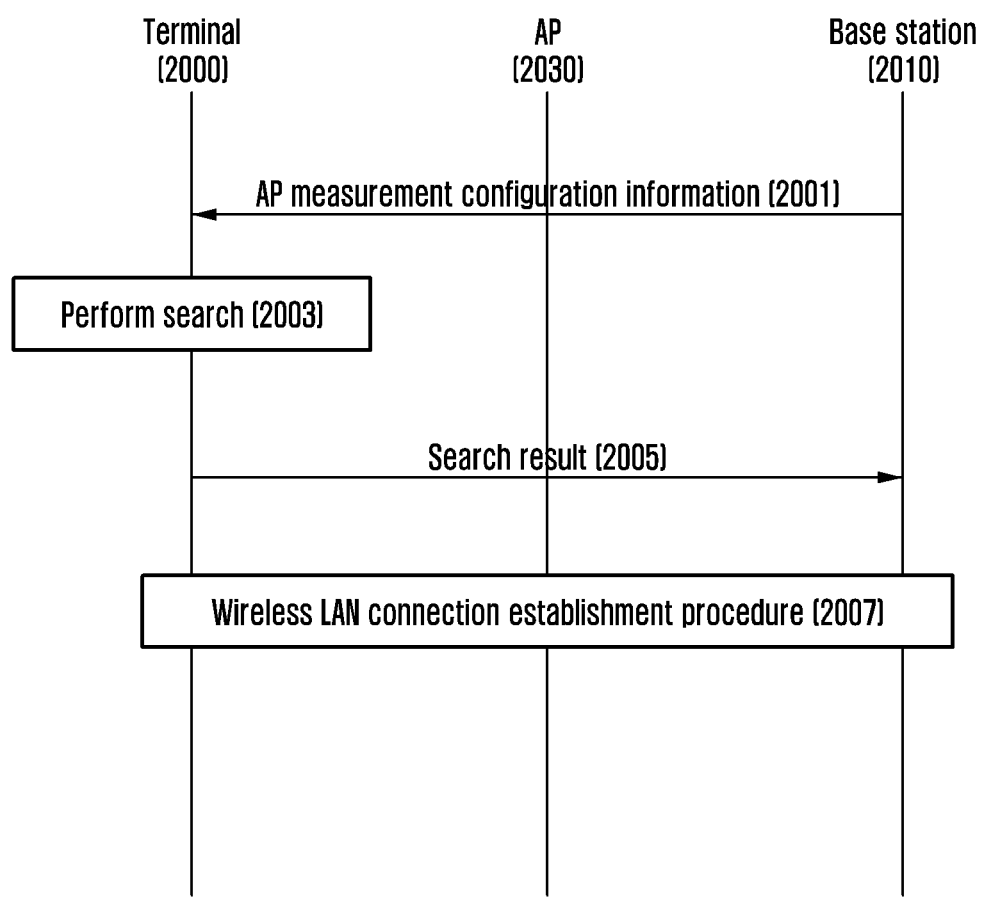
FIG. 20 is a diagram illustrating a procedure for establishing a connection with an access node providing an additional connection in the wireless communication system according to the embodiment of the present disclosure.

FIG. 20 is a diagram illustrating a procedure for establishing a connection with an access node providing an additional connection in the wireless communication system according to the embodiment of the present disclosure.

Referring to FIG. 20, in step 2001, the base station 2010 transmits the AP measurement configuration information to a terminal 2000. The information may be transmitted using a RRC connection reconfiguration message among control messages of a radio resource control (RRC) layer.

The AP measurement configuration information includes information for guiding the terminal 2000 to connect to an AP 2030 selected by a base station 2010. For example, the AP measurement configuration information includes information necessary to scan the AP 2030, and specifically may include at least one of an identifier of the AP 2030, an operating frequency of the AP 2030, and a threshold value of the signal strength for determining the scanning success.

The identifier of the AP may include a service set identifier (hereinafter, referred to as SSID), a basic service set identifier (hereinafter, referred to as BSSID), and a homogeneous extended service set identifier (hereinafter, referred to as HESSID).

The SSID is a text identifier having a size ranging from 0 to 32 bytes. The SSID is an identifier that a user can watch upon scanning neighboring wireless LANs, and a plurality of APs can use the same SSID. The BSSID is an address of a media access control (MAC) layer for each AP, is unique to each AP, and has a length of 6 bytes. In addition, the HESSID is for replacing the SSID, and the HESSID is an MAC layer address of a representative AP among the APs having a length of 6 bytes and operated by the same service providers.

The ID for identifying each AP among the identifiers is the BSSID, and information of N*6 bytes needs to be transmitted to indicate all N wireless LAN AP identifiers (i.e., BSSIDs) in the coverage of the base station. Assuming that the coverage of the base station may be several kilometers, the N may be hundreds, which may act as a large overhead.

Figure 21:
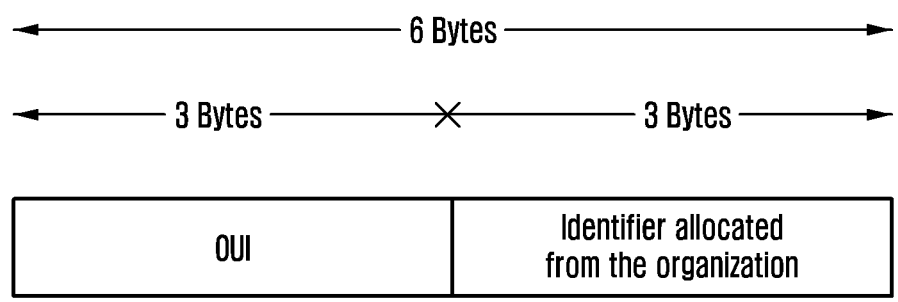
FIG. 21 is a diagram illustrating an address of an MAC layer used as a BSSID in the wireless communication system according to the embodiment of the present disclosure.

FIG. 21 is a diagram illustrating an address of an MAC layer used as a BSSID in the wireless communication system according to the embodiment of the present disclosure.

Referring to FIG. 21, the address of the MAC layer used as the BSSID has a length of 6 bytes as described above, and the upper 3 bytes means an organization (for example, an AP manufacturer) to which the present identifier is allocated and an organizationally unique identifier (hereinafter referred to as OUI), and the lower 3 bytes are identifiers allocated separately by the organization/company. Therefore, if a communication service provider purchases the AP from the specific manufacturer and installs it, the OUI may be duplicated and therefore the OUI may be omitted and transmitted to the terminal, thereby reducing the overhead.

Referring back to FIG. 20, in step 2003, the terminal 2000 performs the scanning That is, the terminal 2000 detects a scanning related signal received through the Wireless LAN channel to discover the AP 2030. Prior to this, the terminal 2000 may transmit a message requesting the scanning related signal. For example, the scanning related signal may be a beacon signal or a probe signal. When the operating frequency information is provided, the terminal 2000 may perform the scanning only the channel indicated by the operating frequency information without performing the scanning for all the Wireless LAN channels. As a result, the time and the power consumption required for the scanning may be reduced.

In step 2005, the terminal 2000 transmits the scanning result to the base station 2010. The scanning result may be transmitted using a measurement report (MeasurementReport) message among the control messages of the radio resource control (RRC) layer. The scanning result may include whether the scanning for the AP 2030 succeeds, the signal strength for the AP 2030, or the signal quality. If other access nodes other than the AP 2030 are discovered, the terminal 2000 may report the discovery and measurement related information for the other access node to the base station 2010. In this case, the base station 2010 may select one of a plurality of access nodes including the AP 2030, and inform the terminal 2020 of the selected access node. In the embodiment illustrated in FIG. 20, it is assumed that the terminal 200 discovers the AP 2030.

In step 2007, the terminal 2000 performs the wireless LAN connection establishment procedure. Specifically, the base station 2010 transmits to the terminal 230 a message instructing to establish an additional connection through the AP 2030, and the terminal 2000 and the AP 2030 performs the signaling and operation for the connection establishment.

For example, the terminal 2000 may transmit a message requesting authentication to the AP 2030 and transmit a message requesting association. As a result, in addition to the connection provided by the base station 2010, the terminal 2000 may perform the multi-connection through the connection provided by the AP 2030.

That is, a third embodiment of the present disclosure includes a process of receiving a message instructing a measurement of a signal of a second access node using a second wireless access technology from a first access node using a first wireless access technology, measuring the signal of the second access node depending on the received message, and reporting the measured result to the first access node. At this time, the first access node may be the LTE base station and the second access node may be the AP.

In addition, the first access node using the first radio access technology may generate a message instructing the measurement of the signal of the second access node and transmit the message to the terminal.

Figure 22:
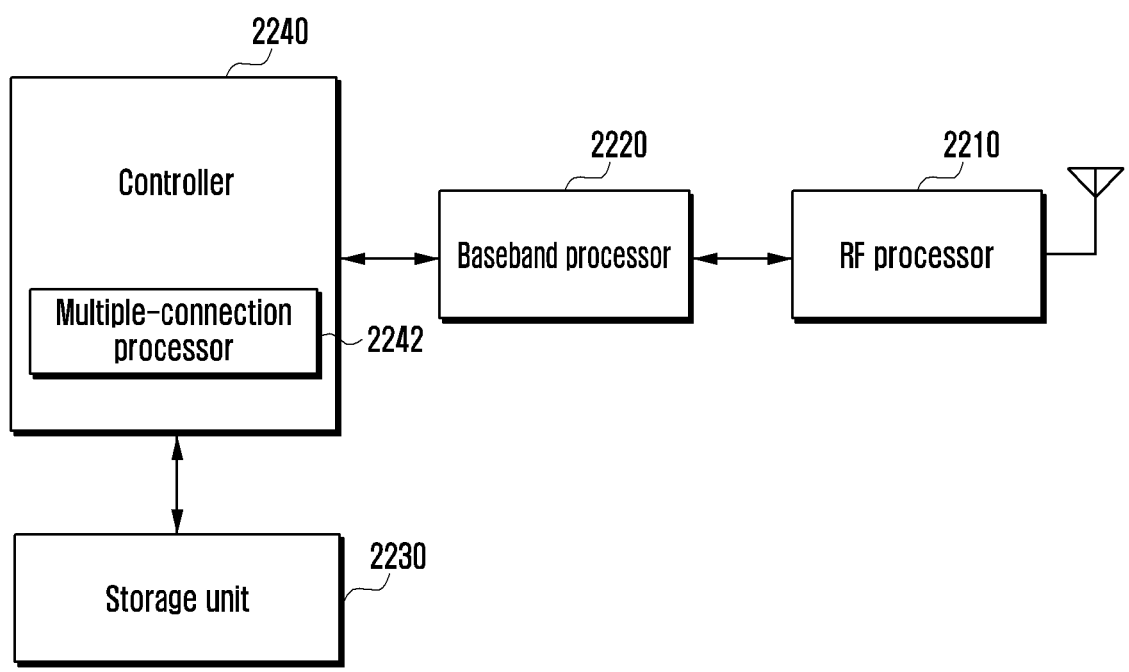
FIG. 22 is a block configuration diagram of the terminal in the wireless communications system according to the exemplary embodiment of the present disclosure.

FIG. 22 is a block configuration diagram of the terminal in the wireless communications system according to the exemplary embodiment of the present disclosure.

Referring to FIG. 22, the terminal includes a radio frequency (RF) processor 2210, a baseband processor 2220, a storage unit 2230, and a controller 2240.

The RF processor 2210 serves to transmit/receive a signal through a radio channel, such as band conversion and amplification of a signal. That is, the RF processor 2210 up-converts a baseband signal provided from the baseband processor 2220 into an RF band signal and then transmits the baseband signal through an antenna, and down-converts the RF band signal received through the antenna into the baseband signal. For example, the RF processor 2210 may include a transmitting filter, a receiving filter, an amplifier, a mixer, an oscillator, a digital to analog converter (DAC), an analog to digital converter (ADC), or the like. FIG. 22 illustrates only one antenna but the terminal may include a plurality of antennas. Further, the RF processor 2210 may include a plurality of RF chains. Further, the RF processor 2210 may perform beamforming. For the beamforming, the RF processor 2210 may adjust a phase and a size of each of the signals transmitted/received through a plurality of antennas or antenna elements.

The baseband processor 2220 performs a conversion function between the baseband signal and a bit string according to a physical layer standard of the system. For example, when data are transmitted, the baseband processor 2220 generates complex symbols by coding and modulating a transmitting bit string. Further, when data are received, the baseband processor 2220 recovers the receiving bit string by demodulating and decoding the baseband signal provided from the RF processor 2210.

For example, according to the orthogonal frequency division multiplexing (OFDM) scheme, when data are transmitted, the baseband processor 2220 generates the complex symbols by coding and modulating the transmitting bit string, maps the complex symbols to sub-carriers, and then performs an inverse fast Fourier transform (IFFT) operation and a cyclic prefix (CP) insertion to configure the OFDM symbols. Further, when data are received, the baseband processor 2220 divides the baseband signal provided from the RF processor 2210 in an OFDM symbol unit and recovers the signals mapped to the sub-carriers by a fast Fourier transform (FFT) operation, and then recovers the receiving bit string by the modulation and decoding.

The baseband processor 2220 and the RF processor 2210 transmit/receive a signal as described above. Therefore, the baseband processor 2220 and the RF processor 2210 may be called a transmitter, a receiver, a transceiver, or a communication unit. Further, at least one of the baseband processor 2220 and the RF processor 2210 may include a plurality of communication modules to support a plurality of different radio access technologies. Further, at least one of the baseband processor 2220 and the RF processor 2210 may include different communication modules to process signals in different frequency bands. For example, different radio access technologies may include the wireless LAN (for example: IEEE 802.11), a cellular network (for example: LTE), or the like. Further, different frequency bands may include a super high frequency (SHF) (for example: 2.5 GHz, 5 GHz) band, a millimeter wave (for example: 60 GHz) band.

The storage unit 2230 stores data such as basic programs, application programs, and configuration information for the operation of the terminal. In particular, the storage unit 2230 may store information associated with a second access node performing wireless communication using a second access technology. Further, the storage unit 2230 provides the stored data according to the request of the controller 2240.

The controller 2240 controls the overall operations of the terminal. For example, the controller 2240 transmits/receives a signal through the baseband processor 2220 and the RF processor 2210. In addition, the controller 2240 records data in the storage unit 2230 and reads the data. For this purpose, the controller 2240 may include at least one processor. For example, the controller 2240 may include a communication processor (CP) performing a control for communication and an application processor (AP) controlling a higher layer such as application programs. According to the embodiment of the present disclosure, the controller 2240 includes a multi-connection processor 2242 that performs the processing to be operated in a multi-connection mode. For example, the controller 2240 may control the terminal to perform the procedure of the operation of the terminal illustrated in FIG. 22. The operation of the controller 2240 according to the embodiment of the present disclosure is as follows.

According to the embodiment of the present disclosure, the controller 2240 receives a message instructing the setting of the measurement of the second access node from the first access node performing the wireless communication using the first wireless access technology. Here, the message may include at least one of the identification information (e.g., SSID and BSSID) of the second connection, the operation frequency of the AP, and the threshold value of the signal strength for determining the scanning success. Accordingly, the controller 2240 performs the signal measurement of the second access node.

Figure 23:
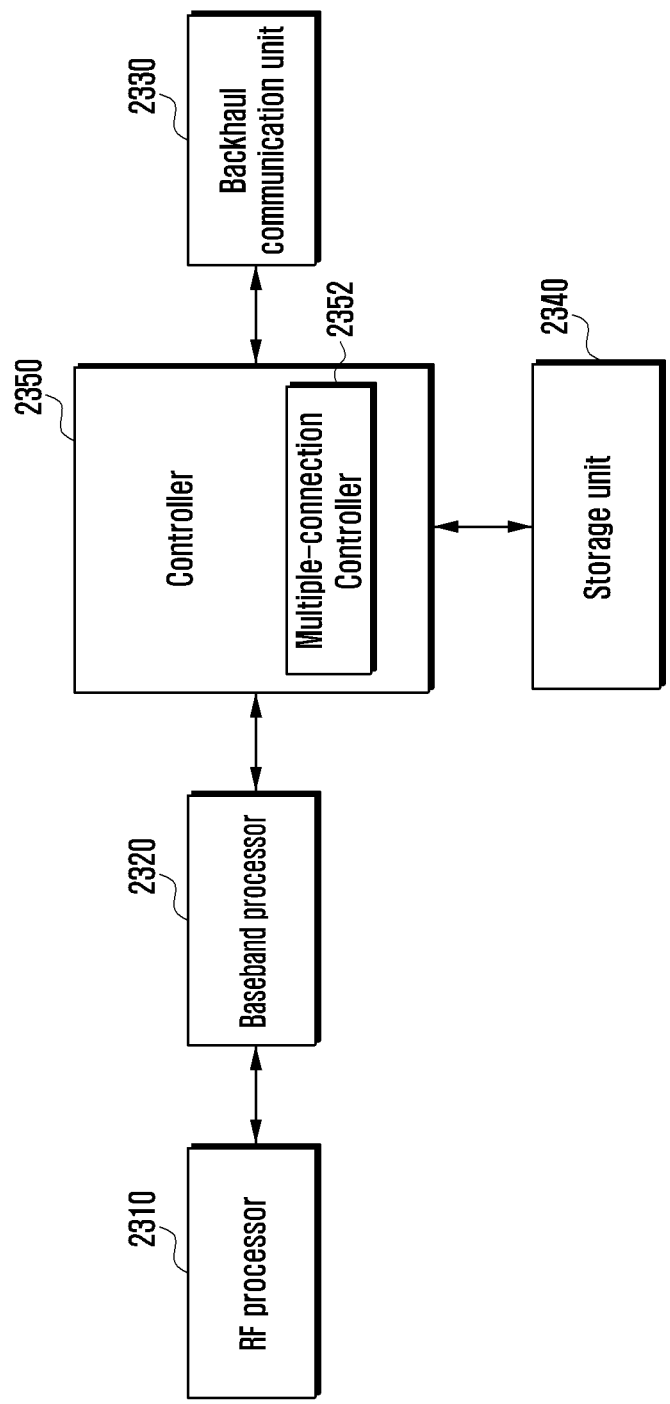
FIG. 23 is a block configuration diagram of the first access node in the wireless communications system according to the embodiment of the present disclosure.

FIG. 23 is a block configuration diagram of the first access node in the wireless communications system according to the embodiment of the present disclosure.

As illustrated in FIG. 23, the first access node is configured to include an RF processor 2310, a baseband processor 2320, a backhaul communication unit 2330, a storage unit 2340, and a controller 2350.

The RF processor 2310 serves to transmit/receive a signal through a radio channel, such as band conversion and amplification of a signal. That is, the RF processor 2310 up-converts a baseband signal provided from the baseband processor 2320 into an RF band signal and then transmits the baseband signal through an antenna, and down-converts the RF band signal received through the antenna into the baseband signal.

For example, the RF processor 2310 may include a transmitting filter, a receiving filter, an amplifier, a mixer, an oscillator, a DAC, an ADC, etc. FIG. 23 illustrates only one antenna but the first access node may include a plurality of antennas. Further, the RF processor 2310 may include a plurality of RF chains. Further, the RF processor 2310 may perform the beamforming. For the beamforming, the RF processor 2310 may adjust a phase and a size of each of the signals transmitted/received through a plurality of antennas or antenna elements.

The baseband processor 2320 performs a conversion function between the baseband signal and the bit string according to the physical layer standard of the first radio access technology. For example, when data are transmitted, the baseband processor 2320 generates complex symbols by coding and modulating a transmitting bit string. Further, when data are received, the baseband processor 2320 recovers the receiving bit string by demodulating and decoding the baseband signal provided from the RF processor 2310. For example, according to the OFDM scheme, when data are transmitted, the baseband processor 2320 generates the complex symbols by coding and modulating the transmitting bit string, maps the complex symbols to the sub-carriers, and then performs the IFFT operation and the CP insertion to configure the OFDM symbols.

Further, when data are received, the baseband processor 2320 divides the baseband signal provided from the RF processor 2310 in the OFDM symbol unit and recovers the signals mapped to the sub-carriers by the FFT operation and then recovers the receiving bit string by the modulation and decoding. The baseband processor 2320 and the RF processor 2310 transmit/receive a signal as described above. Therefore, the baseband processor 2320 and the RF processor 2310 may be called a transmitter, a receiver, a transceiver, a communication unit, or a wireless communication unit.

The backhaul communication unit 2330 provides an interface for performing communication with other nodes within the network. That is, the backhaul communication unit 2330 converts bit strings transmitted from the first access node to other nodes, for example, other access nodes, a core network, etc., into physical signals and converts physical signals received from other nodes into bit strings.

The storage unit 2340 stores data such as basic programs, application programs, and configuration information for the operation of the first access node. In particular, the storage unit 2340 may store the information on the bearer allocated to the accessed terminal, the measured results reported from the accessed terminal, etc. Further, the storage unit 2340 may store information that is a determination criterion on whether to provide a multi-connection to the terminal or stop the multi-connection to the terminal. Further, the storage unit 2340 provides the stored data according to the request of the controller 2350.

The controller 2350 controls the overall operations of the first access node. For example, the controller 2350 transmits/receives a signal through the baseband processor 2320 and the RF processor 2310 or the backhaul communication unit 2330. In addition, the controller 2350 records data in the storage unit 2340 and reads the data. For this purpose, the controller 2350 may include at least one processor. The operation of the controller 2350 according to the embodiment of the present disclosure is as follows.

According to the embodiment of the present disclosure, the controller 2350 transmits a message instructing a new measurement of the second node to the terminal using the second wireless access technology. Here, the message may include at least one of identification information (e.g., SSID and BSSID) of the second connection, the operating frequency of the AP 230, and the threshold value of the signal strength for determining the scanning success.

Figure 24:
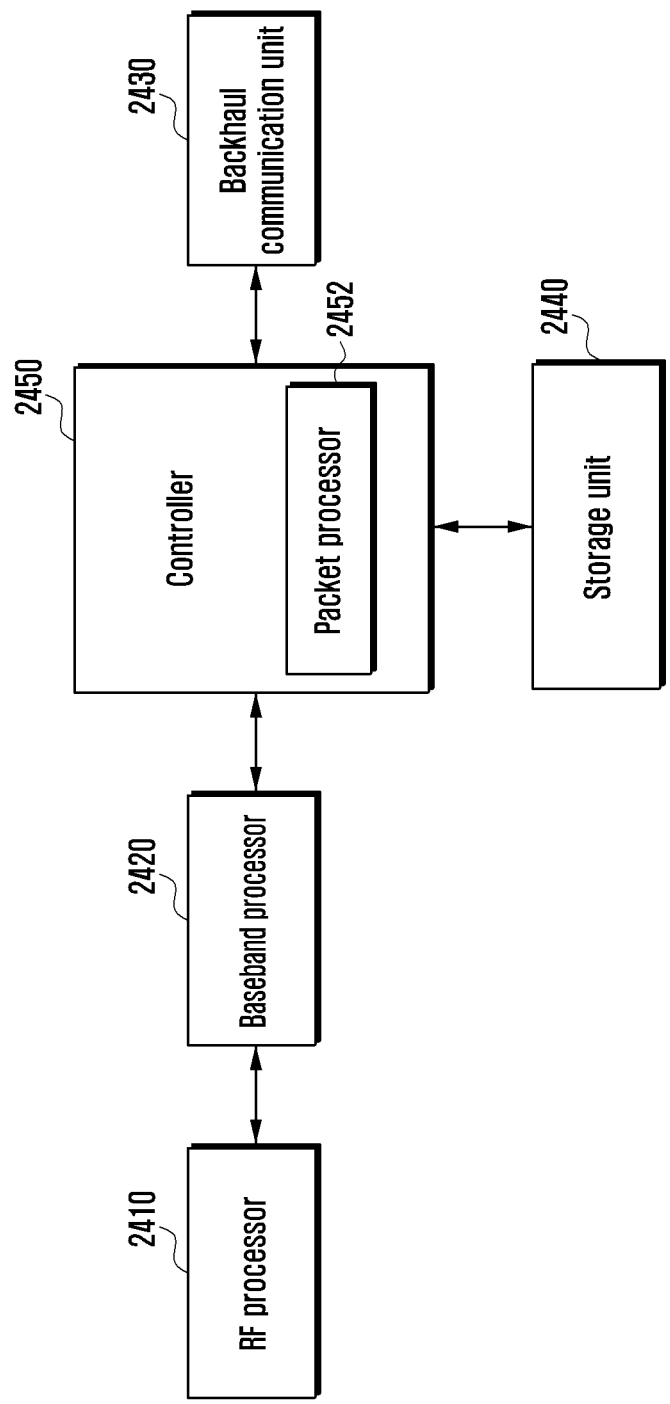
FIG. 24 is a block configuration diagram of the second access node in the wireless communications system according to the embodiment of the present disclosure.

FIG. 24 is a block configuration diagram of the second access node in the wireless communications system according to the embodiment of the present disclosure.

As illustrated in FIG. 24, the second access node is configured to include an RF processor 2410, a baseband processor 2420, a backhaul communication unit 2430, a storage unit 2440, and a controller 2450.

The RF processor 2410 serves to transmit/receive a signal through a radio channel, such as band conversion and amplification of a signal. That is, the RF processor 2410 up-converts a baseband signal provided from the baseband processor 2420 into an RF band signal and then transmits the baseband signal through an antenna, and down-converts the RF band signal received through the antenna into the baseband signal. For example, the RF processor 2410 may include a transmitting filter, a receiving filter, an amplifier, a mixer, an oscillator, a DAC, an ADC, etc. FIG. 24 illustrates only one antenna but the second access node may include a plurality of antennas. Further, the RF processor 2410 may include a plurality of RF chains. Further, the RF processor 2410 may perform the beamforming. For the beamforming, the RF processor 2410 may adjust a phase and a size of each of the signals transmitted/received through a plurality of antennas or antenna elements.

The baseband processor 2420 performs a conversion function between the baseband signal and the bit string according to the physical layer standard of the second radio access technology. For example, when data are transmitted, the baseband processor 2420 generates complex symbols by coding and modulating a transmitting bit string. Further, when data are received, the baseband processor 2420 recovers the receiving bit string by demodulating and decoding the baseband signal provided from the RF processor 2410. For example, according to the OFDM scheme, when data are transmitted, the baseband processor 2420 generates the complex symbols by coding and modulating the transmitting bit string, maps the complex symbols to the sub-carriers, and then performs the IFFT operation and the CP insertion to configure the OFDM symbols. Further, when data are received, the baseband processor 2420 divides the baseband signal provided from the RF processor 2410 in the OFDM symbol unit and recovers the signals mapped to the sub-carriers by the FFT operation and then recovers the receiving bit string by the modulation and decoding. The baseband processor 2420 and the RF processor 2410 transmit/receive a signal as described above. Therefore, the baseband processor 2420 and the RF processor 2410 may be called a transmitter, a receiver, a transceiver, a communication unit, or a wireless communication unit.

The backhaul communication unit 2430 provides an interface for performing communication with other nodes within the network. That is, the backhaul communication unit 2430 converts bit strings transmitted from the second access node to other nodes, for example, other access nodes, a core network, etc., into physical signals and converts physical signals received from other nodes into bit strings.

The storage unit 2440 stores data such as basic programs, application programs, and configuration information for the operation of the second access node. In particular, the storage unit 2440 may store the information on the bearer allocated to the accessed terminal, the measured results reported from the accessed terminal, etc. Further, the storage unit 2440 may store information that is a determination criterion on whether to provide a multi-connection to the terminal or stop the multi-connection to the terminal. Further, the storage unit 2440 provides the stored data according to the request of the controller 2450.

The controller 2450 controls the overall operations of the second access node. For example, the controller 2450 transmits/receives a signal through the baseband processor 2420 and the RF processor 2410 or the backhaul communication unit 2430. In addition, the controller 2450 records data in the storage unit 2440 and reads the data. For this purpose, the controller 2450 may include at least one processor. According to the embodiment of the present disclosure, the controller 2450 includes a packet processor 2452 that performs data transmitted/received to the terminal operated in a multi-connection mode. The packet processor 2452 may generate and analyze a packet of a second radio access technology including a packet of the first radio access technology as a payload.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the present disclosure through an external port. Further, a separate storage device on the communication network may also access a device performing the embodiment of the present disclosure.

Meanwhile, the embodiments of the present disclosure disclosed in the present specification and the accompanying drawings have been provided only as specific examples in order to assist in understanding the present disclosure and do not limit the scope of the present disclosure. It is obvious to those skilled in the art to which the present disclosure pertains that various modifications may be made without departing from the scope of the present disclosure, in addition to the embodiments disclosed herein.

The invention claimed is:

1. A method for providing a multi-connection by a user equipment (UE) using different radio access technologies in a wireless communication system, the method comprising:

receiving, from a base station, a radio resource control, RRC, control message instructing to reconfigure a first bearer to a second bearer or reconfigure the second bearer to the first bearer, wherein the first bearer is associated with a long term evolution, LTE, communication and the second bearer is associated with both the LTE communication and a wireless fidelity, WIFI, communication;

performing a packet data convergence protocol (PDCP) reordering if the first bearer is reconfigured to the second bearer based on the RRC control message; and performing the PDCP reordering and transmitting a PDCP status report if the second bearer is reconfigured to the first bearer based on the RRC control message.

2. The method of claim 1, further comprising:

establishing an RRC connection with the base station; and reporting, to the base station, aggregation capability for the LTE and WIFI communications of the UE.

3. The method of claim 1, wherein the first bearer is a bidirectional bearer in which both uplink transmission and downlink reception are performed, wherein the downlink reception is performed through first and second layer devices of the LTE communication, and wherein the uplink transmission is performed through the first and second layer devices of the LTE communication.

4. The method of claim 1, wherein the second bearer is a bidirectional bearer in which both uplink transmission and downlink reception are performed, wherein the downlink reception is performed through first and second layer devices of the LTE communication and first and second layer devices of the WIFI communication, and wherein the uplink transmission is performed through the first and second layer devices of the LTE communication or the first and second layer devices of the WIFI communication.

5. The method of claim 1, wherein the LTE communication and the WIFI communication use different frequency bands.

6. A user equipment (UE) for providing a multi-connection using different radio access technologies in a wireless communication system, the UE comprising:

a transceiver; and a controller coupled with the transceiver and configured to control to:

receive, from a base station, a radio resource control (RRC) control message instructing to reconfigure a first bearer to a second bearer or reconfigure the second bearer to the first bearer, wherein the first bearer is associated with a long term evolution, LTE, communication and the second bearer is associated with both the LTE communication and a wireless fidelity, WIFI, communication, perform a packet data convergence protocol (PDCP) reordering if the first bearer is reconfigured to the second bearer based on the RRC control message; and perform the PDCP reordering and transmit a PDCP status report if the second bearer is reconfigured to the first bearer based on the RRC control message.

7. The UE of claim 6, wherein the controller establishes an RRC connection with the base station and reports, to the base station, aggregation capability for the LTE and WIFI communications of the UE.

8. The UE of claim 6, wherein the first bearer is a bidirectional bearer in which both uplink transmission and downlink reception are performed, wherein the downlink reception is performed through first and second layer devices of the LTE communication, and wherein the uplink transmission is performed through the first and second layer devices of the LTE communication.

9. The UE of claim 6, wherein the second bearer is a bidirectional bearer in which both uplink transmission and downlink reception are performed, wherein the downlink reception is performed through first and second layer devices of the LTE communication and first and second layer devices of the WIFI communication, and wherein the uplink transmission is performed through the first and second layer devices of the LTE communication or the first and second layer devices of the WIFI communication.

* * * * *